US011234113B2

(12) United States Patent
Choi et al.

(10) Patent No.: US 11,234,113 B2
(45) Date of Patent: Jan. 25, 2022

(54) ELECTRONIC DEVICE AND METHOD FOR PROVIDING SERVICE BY ELECTRONIC DEVICE

(71) Applicant: Samsung Electronics Co., Ltd., Gyeonggi-do (KR)

(72) Inventors: Jongmu Choi, Gyeonggi-do (KR); Bokun Choi, Gyeonggi-do (KR); Doosuk Kang, Gyeonggi-do (KR); Dooho Lee, Gyeonggi-do (KR); Youngkow Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/991,712

(22) Filed: Aug. 12, 2020

(65) Prior Publication Data

US 2021/0051462 A1 Feb. 18, 2021

(30) Foreign Application Priority Data

Aug. 16, 2019 (KR) .................. 10-2019-0100320

(51) Int. Cl.
*H04W 4/00* (2018.01)
*H04W 8/00* (2009.01)
(Continued)

(52) U.S. Cl.
CPC ............. *H04W 8/005* (2013.01); *H04W 4/80* (2018.02); *H04W 48/16* (2013.01); *H04W 76/15* (2018.02)

(58) Field of Classification Search
CPC ....... H04W 8/005; H04W 4/80; H04W 76/15; H04W 48/16; H04W 8/00
(Continued)

(56) References Cited

U.S. PATENT DOCUMENTS 9,674,643 B2 * 6/2017 Qi ........................... H04L 67/16
9,998,905 B2 * 6/2018 Qi ........................... H04W 76/10
(Continued)

FOREIGN PATENT DOCUMENTS

JP 2018-019144 2/2018
KR 10-2003-0017043 3/2003
(Continued)

OTHER PUBLICATIONS

International Search Report dated Nov. 11, 2020 issued in counterpart application No. PCT/KR2020/010309, 13 pages.

*Primary Examiner* — Marceau Milord
(74) *Attorney, Agent, or Firm* — The Farrell Law Firm, P.C.

(57) ABSTRACT

An electronic device is provided, which includes a first communication circuit supporting a neighbor awareness networking (NAN) protocol; a second communication circuit configured to support a second protocol different from the NAN protocol; a memory; and a processor operatively connected to the first communication circuit, the second communication circuit, and the memory. The processor is configured to activate the NAN protocol supported by the first communication circuit, receive data from at least one external electronic device during a discovery window (DW) interval synchronized in a cluster via the first communication circuit, identify whether identification information of the at least one external electronic device having transmitted the data is stored in the memory, if the identification information of the at least one external electronic device is stored in the memory, store, in the memory, information that is obtained by matching at least a part of the received data with the identification information, and if a request for performing a service is received, display information of the
(Continued)

at least one external electronic device configured to perform the service, based on the information stored in the memory.

20 Claims, 26 Drawing Sheets

(51) Int. Cl.
*H04W 4/80* (2018.01)
*H04W 76/15* (2018.01)
*H04W 48/16* (2009.01)

(58) Field of Classification Search
USPC .......................................... 370/329, 338, 328
See application file for complete search history.

(56) References Cited

U.S. PATENT DOCUMENTS

| | | | | |
|---|---|---|---|---|
| 10,425,803 | B2* | 9/2019 | Qi | .......................... H04W 76/23 |
| 10,660,017 | B2* | 5/2020 | Mestanov | .............. H04W 4/023 |
| 10,880,824 | B2* | 12/2020 | Jung | ...................... H04W 48/16 |
| 2008/0301233 | A1 | 12/2008 | Choi | |
| 2014/0177615 | A1 | 6/2014 | Kim et al. | |
| 2015/0071121 | A1* | 3/2015 | Patil | ........................ H04L 67/16 |
| | | | | 370/255 |
| 2015/0109981 | A1* | 4/2015 | Patil | ...................... H04W 48/16 |
| | | | | 370/311 |
| 2015/0172391 | A1* | 6/2015 | Kasslin | ............. H04W 52/0229 |
| | | | | 370/338 |
| 2015/0172902 | A1* | 6/2015 | Kasslin | ................... H04L 67/16 |
| | | | | 370/328 |
| 2015/0172905 | A1* | 6/2015 | Qi | ....................... H04L 67/1061 |
| | | | | 370/338 |
| 2015/0223047 | A1* | 8/2015 | Abraham | .......... H04W 52/0216 |
| | | | | 370/328 |
| 2015/0282132 | A1 | 10/2015 | Kim et al. | |
| 2016/0014715 | A1* | 1/2016 | Patil | ...................... H04W 74/06 |
| | | | | 370/329 |
| 2016/0150392 | A1 | 5/2016 | Jung et al. | |
| 2016/0157089 | A1* | 6/2016 | Qi | .......................... H04W 8/005 |
| | | | | 370/254 |
| 2016/0223333 | A1* | 8/2016 | Thakur | ................... G01C 21/20 |
| 2016/0286398 | A1* | 9/2016 | Abraham | .............. H04L 63/123 |
| 2017/0034254 | A1 | 2/2017 | Salkintzis | |
| 2017/0094496 | A1 | 3/2017 | Aoki | |
| 2017/0150296 | A1* | 5/2017 | Jung | .................... H04L 12/1886 |
| 2017/0230814 | A1* | 8/2017 | Qi | ............................ H04W 4/80 |
| 2018/0027601 | A1 | 1/2018 | Hamachi | |
| 2018/0183701 | A1* | 6/2018 | Qi | ....................... H04W 40/246 |
| 2018/0279110 | A1 | 9/2018 | Sen et al. | |
| 2018/0359625 | A1 | 12/2018 | Qi et al. | |
| 2019/0089686 | A1 | 3/2019 | Jung et al. | |
| 2019/0090175 | A1 | 3/2019 | Mestanov et al. | |

FOREIGN PATENT DOCUMENTS

| | | |
|---|---|---|
| KR | 10-2004-0063626 | 7/2004 |
| KR | 10-0623194 | 9/2006 |
| KR | 10-2007-0082682 | 8/2007 |
| KR | 10-2010-0053805 | 5/2010 |
| KR | 10-2015-006892 | 6/2015 |
| KR | 1020160062602 | 6/2016 |
| KR | 1020170036619 | 4/2017 |
| KR | 10-2018-0022890 | 3/2018 |
| KR | 10-2019-0032845 | 3/2019 |

* cited by examiner

| Octets: | 2 | 2 | 6 | 6 | 6 | 2 | 8 | 2 | 2 | Var. | 4 |
|---|---|---|---|---|---|---|---|---|---|---|---|
| | FC | Duration | A1 | A2 | A3 | Seq. Ctrl | Time Stamp | Beacon Interval | Capability | NANIE | FCS |

Where:

FC is the Frame Control field as defined in [1]. The fromDS and toDS bits within the Frame Control field shall be set to zero.

Duration is the duration value for the beacon frame as defined in [1].

A1 is set to the broadcast address.

A2 is the transmitter MAC address.

A3 is the Cluster ID that identifies the NAN Cluster and is described in section 9.5.2...

Seq Ctrl is the sequence control field as defined in [1].

Time Stamp is the time stamp for the beacon frame as defined in [1].

FIG.7

| Field | Size(Octets) | Value (Hex) | Description |
|---|---|---|---|
| Matching Filter Length | 0 or 1 | Variable | An optional field and present if a matching service discovery filter is used |
| Matching Filter | Variable | Variable | An optional field that is a sequence of length and value pairs that identify the matching service discovery filters, refer to Figure 47 |

Octets:

| 1 | Variable | 1 | Variable |
|---|---|---|---|
| Length | Filter Value | Length | Filter Value |

FIG.8A

| | B1 | B2 | B3 | B4 |
|---|---|---|---|---|
| Matching filter field in Subscribe message | <0><0><0><0><0> | <1,1><1,2><1,3><1,4><1,5> | <1,1><1,2><1,3><1,4><1,5> | <1,1><1,2><1,3><1,4><1,5> |
| matching_filter_rx for Publish funtion | <1,1><1,2><1,3><1,4><1,5> | <0><0><0><0><0> | <1,1><1,2><1,3><1,4><1,5> | <1,1><1,2><1,1><1,4><1,5> |
| Meet trigger condition? | Yes | Yes | Yes | No |

FIG.8B

ELECTRONIC DEVICE AND METHOD FOR PROVIDING SERVICE BY ELECTRONIC DEVICE

CROSS-REFERENCE TO RELATED APPLICATION(S)

This application is based on and claims priority under 35 U.S.C. § 119 to Korean Patent Application No. 10-2019-0100320, filed on Aug. 16, 2019, in the Korean Intellectual Property Office, the entire disclosure of which is incorporated herein by reference.

BACKGROUND

1. Field

The disclosure relates generally to an electronic device that provides a variety of services using a neighbor awareness networking (NAN) protocol in a wireless communication system, and a service providing method of the electronic device.

2. Description of Related Art

A user may perform communication-connection to external electronic devices of other users via an electronic device. If a user's electronic device is connected to a cellular network, the user may perform a communication-connection to external electronic devices of other users via a call service, a message service, or a video call service provided by a communication carrier, and may communicate with other the users. The user may communicate with the other users via a social networking service (e.g., Facebook® messenger or Instagram® direct message) using a data network provided by a communication provider.

Even if the electronic device is not connected to a cellular network, the electronic device may use a data network via a wireless network, such as Wi-Fi, and therefore may access and use a variety of server-based devices.

However, a user of an electronic device may have a lot of limitations in performing communication-connection to other electronic devices in an environment in which a cellular network is difficult to use. For example, if there is no Wi-Fi access point in the vicinity of the user, a server-based social networking service is unable to be used, and the user of the electronic device may have a great deal of inconvenience in establishing a communication-connection to external electronic devices of other users. In a server-based social networking service, only when users of respective two electronic devices know a service, to which counterparts subscribe, the users may be connected via the service.

SUMMARY

The disclosure is made to address at least the disadvantages described above and to provide at least the advantages described below.

An aspect of the disclosure is to provide an electronic device and a method for providing a service by the electronic device, in which a variety of services may be intuitively and conveniently used, independently or together, with a cellular network by providing the services using a device-to-device (D2D) communication network based on a NAN protocol.

Another aspect of the disclosure is to provide an electronic device and a method for providing a service by the electronic device, in which an existing cellular network-based communication service may be switched to a D2D communication network-based communication service in an environment in which use of a cellular network is restricted.

An aspect of the disclosure is to provide an electronic device and a method for providing a service by the electronic device, in which, while maintaining the same user experience as that for a service related to a cellular network, a user of the electronic device may receive a service similar to that provided by a cellular network with an electronic device of an adjacent another user, via a D2D communication network based on a NAN protocol.

In accordance with an aspect of the disclosure, an electronic device is provided, which includes a first communication circuit supporting a neighbor awareness networking (NAN) protocol; a second communication circuit configured to support a second protocol that is different from the NAN protocol; a memory; and a processor configured to activate the NAN protocol supported by the first communication circuit, receive data from an external electronic device during a discovery window interval synchronized in a cluster via the first communication circuit, identify whether identification information of the external electronic device having transmitted the data is stored in the memory, if the identification information of the external electronic device is stored in the memory, store, in the memory, information that is obtained by matching at least a part of the received data with the identification information, and if a request for performing a service is received, display information of at least one external electronic device configured to perform the service, based on the information stored in the memory.

In accordance with another aspect of the disclosure, an electronic device is provided, which includes a first communication circuit supporting a neighbor awareness networking (NAN) protocol; a second communication circuit configured to support a second protocol that is different from the NAN protocol; a memory; and a processor configured to if deactivation of the second protocol supported by the second communication circuit is identified, activate the NAN protocol supported by the first communication circuit; receive data from at least one external electronic device during a discovery window (DW) interval synchronized in a cluster, based on the data, identify information of the at least one external electronic device, in information on a plurality of external electronic devices that is stored in the memory and service information that can be provided by the at least one external electronic device using the NAN protocol, and in response to a request for displaying the service information, display the information of the at least one external electronic device and the service information that can be provided by the at least one external electronic device using the NAN protocol.

In accordance with another aspect of the disclosure, a method is provided for providing service information by an electronic device. The method includes receiving, while a neighbor awareness networking (NAN) protocol supported by a first communication circuit is activated, data from an external electronic device during a discovery window (DW) interval synchronized in a cluster; identifying whether identification information of the external electronic device having transmitted the data is stored in a memory of the electronic device; in response to the identification information of the external electronic device being stored in the memory of the electronic device, storing, in the memory, information that is obtained by matching at least a part of the received data with the identification information; receiving a request for performing a service; and displaying, in response to the request, information of at least one external electronic device configured to perform the service, based on the information stored in the memory.

BRIEF DESCRIPTION OF THE DRAWINGS

The above and other aspects, features, and advantages of certain embodiments of the disclosure will be more apparent from the following detailed description taken in conjunction with the accompanying drawings, in which:

FIG. 7 illustrates a synchronization beacon frame according to an embodiment;

FIG. 8A illustrates a matching filter according to an embodiment;

FIG. 8B illustrates a matching filter according to an embodiment;

DETAILED DESCRIPTION

Figure 1:
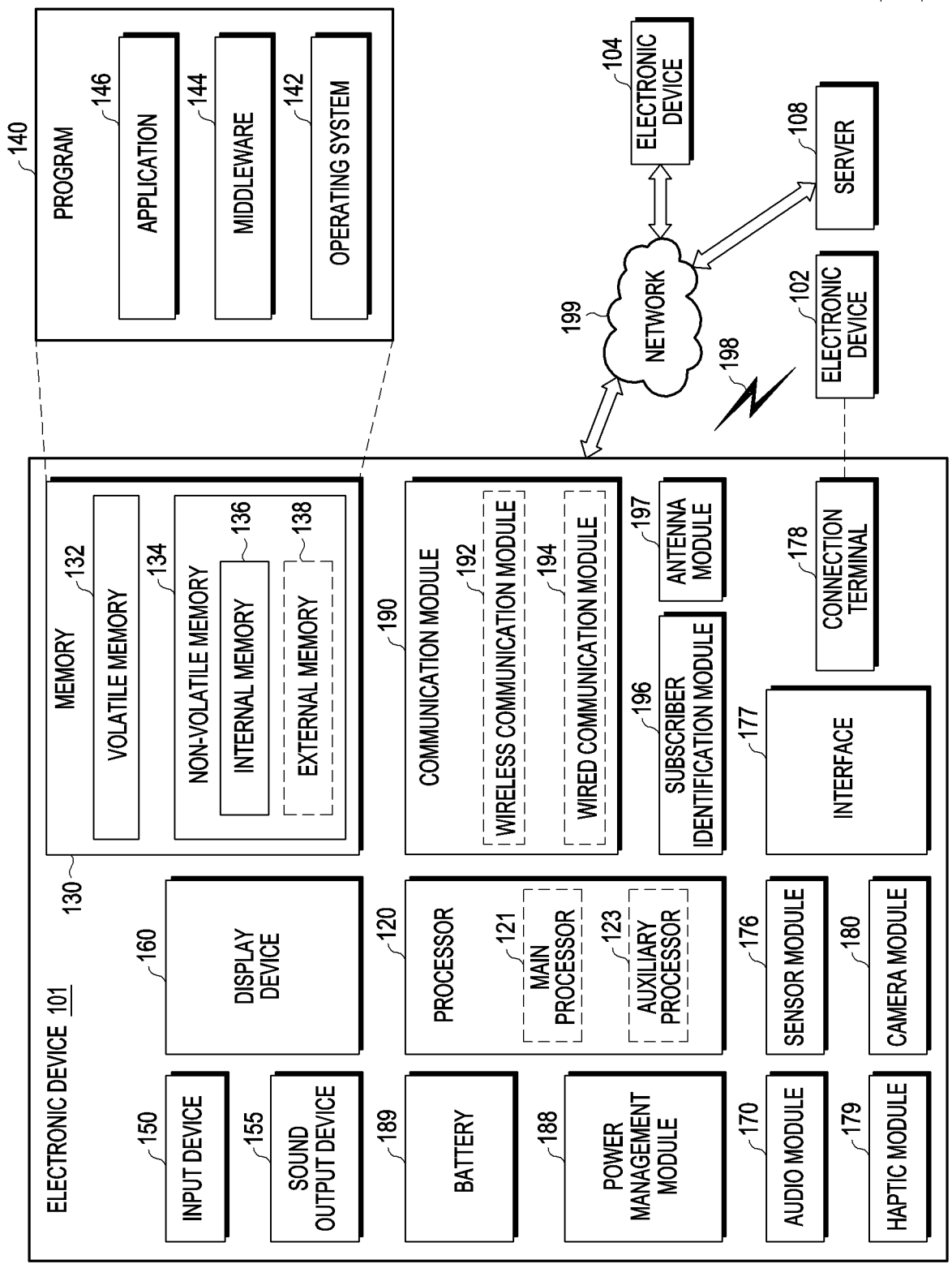
FIG. 1 illustrates an electronic device in a network environment according to an embodiment.

Hereinafter, various embodiments of the disclosure will be described in detail in conjunction with the accompanying drawings. In the following description of the disclosure, a detailed description of known functions or configurations incorporated herein will be omitted when it may make the subject matter of the disclosure rather unclear. The terms described below are defined in consideration of the functions in the disclosure, and may be different according to users, intentions of the users, or customs. Therefore, the definitions of the terms should be made based on the contents throughout the specification.

In the following description of the disclosure, a detailed discussion of known functions or configurations incorporated herein will be omitted when it may make the subject matter of the disclosure rather unclear. The terms which will be described below are defined in consideration of the functions in the disclosure, and may be different according to users, intentions of the users, or customs. Therefore, the definitions of the terms should be made based on the contents throughout the specification.

Throughout the specification and drawings, the same or like reference numerals designate the same or like elements.

Additionally, in the accompanying flowcharts, at least one of the steps may be omitted, a sequence of some steps may be changed, or another step may be added.

FIG. 1 illustrates an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or, more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth (BT)™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., a printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
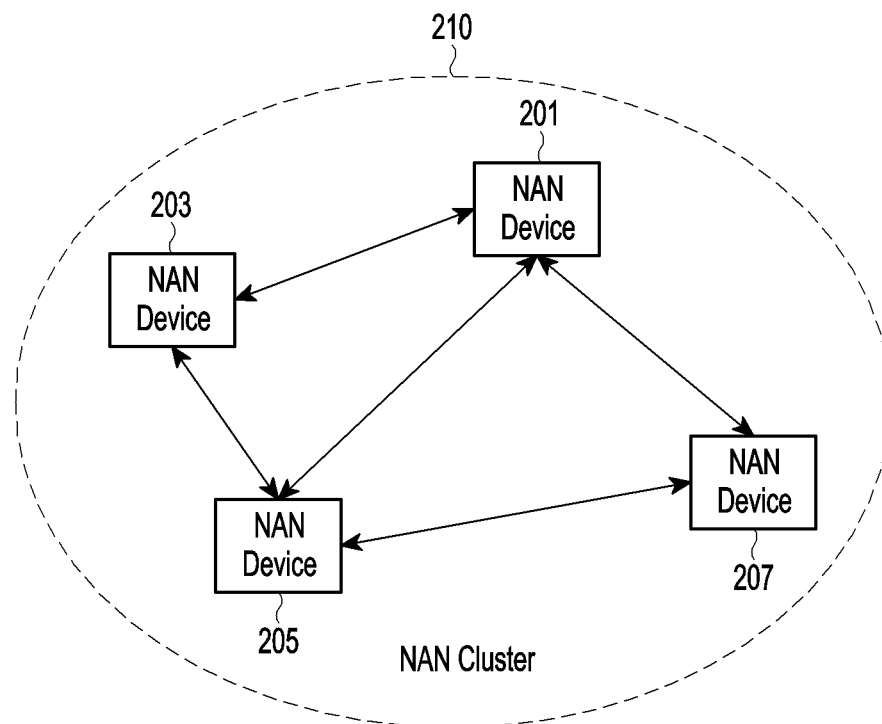
FIG. 2 illustrates a NAN cluster including an electronic device according to an embodiment.

FIG. 2 illustrates a NAN cluster including an electronic device according to an embodiment.

Referring to FIG. 2, the NAN network includes a plurality of electronic devices 201, 203, 205, and 207 supporting a NAN protocol using a set of the same NAN parameters (e.g., an interval between consecutive discovery windows, a discovery window interval, a beacon interval, or a NAN channel).

The plurality of electronic devices 201, 203, 205, and 207 included in a NAN cluster 210 may exchange a synchronization beacon frame and a service discovery frame (SDF) within the same discovery window (DW) interval, due to synchronization of a time clock of a master electronic device. The DW interval is a time (e.g., a millisecond) during which the electronic device wakes up and a lot of current is consumed, whereas, in an interval other than the DW interval, discovery may be possible with low power by maintaining a sleep state of the electronic device.

One electronic device among the plurality of electronic devices 201, 203, 205, and 207 may be a master electronic device, and the remaining electronic devices may be non-master (e.g., non-master sync or non-master non-sync) electronic devices. The master electronic device may transmit a discovery beacon frame including specific information, such as a cluster identifier (ID), in an interval other than a DW interval, and may transmit a synchronization beacon frame and an SDF in the DW interval.

The non-master electronic device may transmit a synchronization beacon frame and an SDF in the DW interval.

Figure 3:
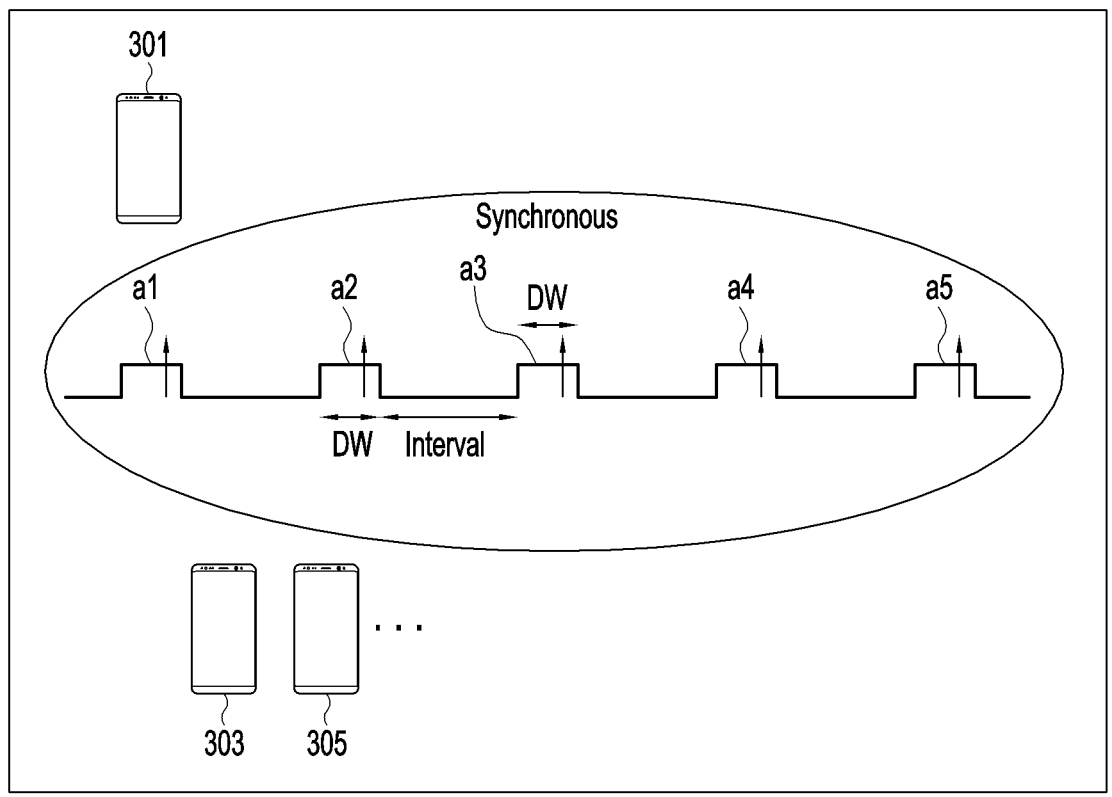
FIG. 3 illustrates an electronic device synchronizing for use of a NAN protocol according to an embodiment.

FIG. 3 illustrates an electronic device using a NAN protocol according to an embodiment.

Referring to FIG. 3, a NAN cluster includes one master electronic device 301 and non-master electronic devices 303 and 305. Electronic devices 301, 303, and 305 participating in the NAN cluster may be synchronized with a common time clock so that DW intervals a1 to a5 may be activated at the same time, and the DW may exist at each designated period (e.g., 512 time units (TUs)). The electronic devices 301, 303, and 305 may exchange various NAN action frame (NAF) messages in the DW intervals a1 to a5, and may also exchange an additional message in an interval other than the DW intervals. For example, the master electronic device 301 may transmit a discovery beacon frame in an interval other than the DW intervals, and may additionally transmit a discovery beacon frame, which has failed to be transmitted in the DW intervals, in the interval other than the DW intervals.

Figure 4:
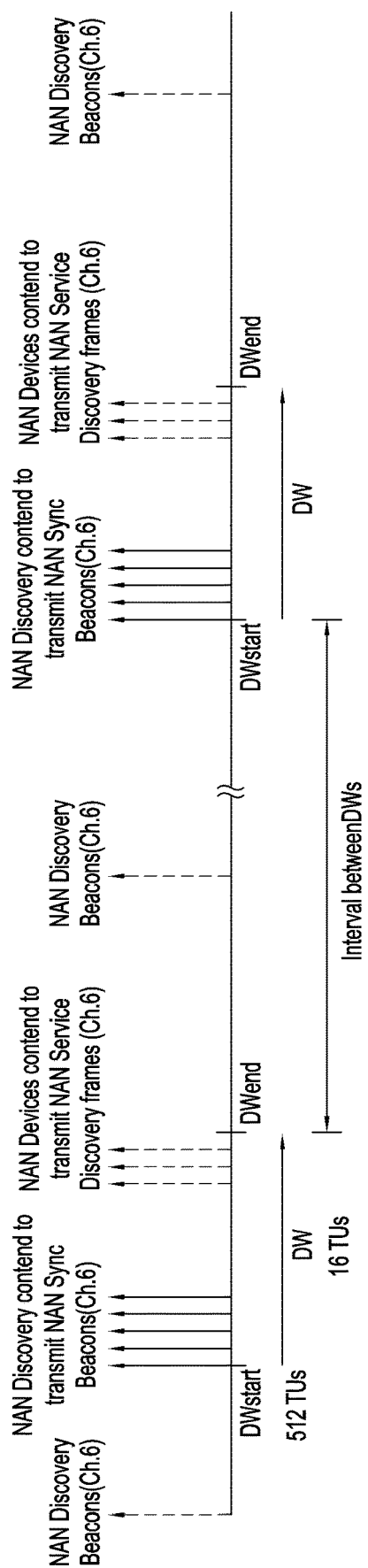
FIG. 4 illustrates data transmission/reception by an electronic device in a discovery window interval according to an embodiment.

FIG. 4 illustrates data transmission/reception by an electronic device in a DW interval according to an embodiment.

Referring to FIG. 4, a plurality of electronic devices participating in the same NAN cluster may be synchronized to a common time clock, and a time synchronization function (TSF) of the NAN cluster may be implemented by a distributed algorithm that is performed in the plurality of electronic devices. Each of the electronic devices (e.g., a master electronic device and/or a non-master electronic device) participating in the NAN cluster may transmit a synchronization beacon frame according to the algorithm, and may synchronize a time clock thereof during a DW interval. A length of the DW interval is 16 TUs. Each of the electronic devices participating in the NAN cluster (e.g., a master electronic device and a non-master electronic device) may transmit the synchronization beacon frame during the DW in order to assist the plurality of electronic devices in the NAN cluster to synchronize time clocks thereof. A transmission time point of the synchronization beacon frame in a NAN protocol may be the DW interval which exists every 512 TUs.

A master electronic device of the plurality of electronic devices may transmit a discovery beacon frame in an interval other than the DW interval. On average, the master electronic device may transmit the discovery beacon frame every 100 TUs, and if a transmission time of the discovery beacon frame overlaps the DW interval of the NAN cluster, the master electronic device may omit transmission of the discovery beacon frame.

A variety of NAFs may be exchanged in the DW interval. For example, types of the NAFs may include a message for NAN data path (NDP) setup for performing data communication in an interval other than the DW interval, a message for updating a schedule, and/or a message for performing NAN ranging which enables a distance between electronic devices to be checked during a fine timing measurement (FTM) period.

According to the NAN protocol, performing message exchange is not defined to only the DW interval, and the electronic device may also configure an additional active time slot by itself in an interval other than the DW interval or may establish and perform additional communication via a procedure of negotiation with a counterpart electronic device. For example, the SDF, which has failed to be executed in the DW interval, may be further executed in an interval other than the DW interval, and an operation for Wi-Fi Direct, mesh, independent basic service set (IBSS), or wireless LAN (WLAN) connection may be designated so as to be used as a procedure for discovery and/or connection via legacy Wi-Fi. Further, ranging between the electronic devices is supportable via FTM between the electronic devices, wherein, if a session for NAN ranging is configured in the DW, and an additional time slot is defined in an interval other than the DW interval, ranging between the electronic devices may be performed.

In the NAN protocol standard, an NDP may allow data communication with a fast setup time by operating on a connectionless basis unlike other communication schemes, and flexible data communication with a plurality of electronic devices may be possible. In the NAN protocol, time slots for data transmission may be defined using an interval other than the DW interval between electronic devices without additional connection between the electronic devices, and data transmitted via the NDP may be encrypted with security.

In the DW interval of the NAN cluster, although channel 6 of a 2.4 GHz band is used as a common channel as shown in FIG. 4, a channel of a 5 GHz band may be concurrently configured as the DW and used.

Figure 5:
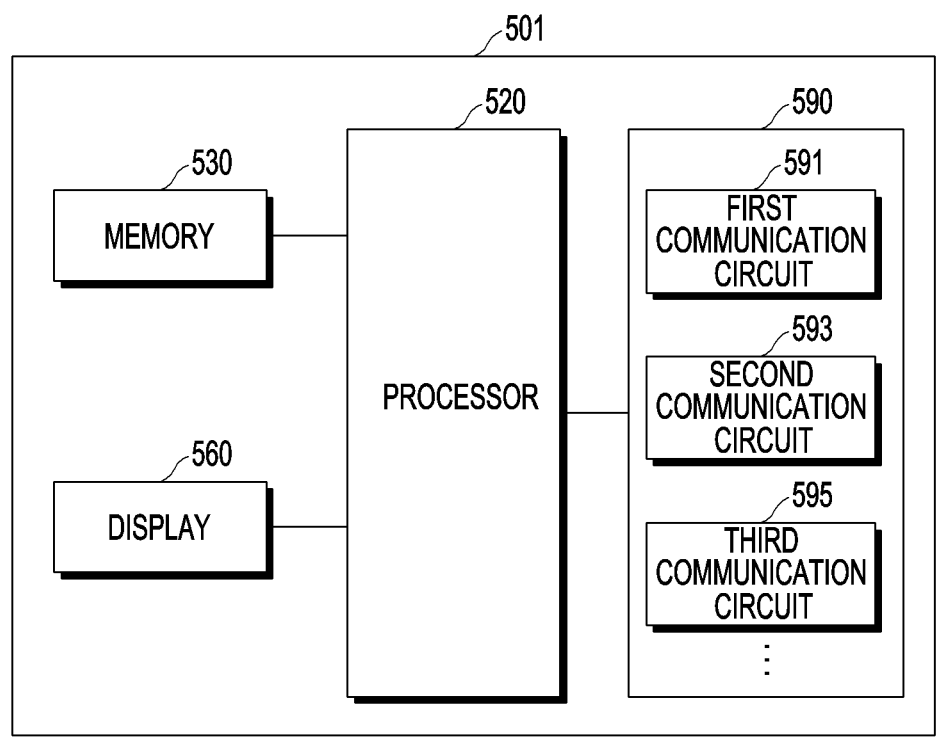
FIG. 5 illustrates electronic device according to an embodiment.

FIG. 5 illustrates an electronic device according to an embodiment.

Referring to FIG. 5, an electronic device 501 includes a communication circuit 590, a memory 530, a processor 520, and a display 560.

The communication circuit 590 includes a first communication circuit 591 supporting a plurality of first protocols (e.g., legacy Wi-Fi and/or Wi-Fi direct) including a NAN protocol, and a second communication circuit 593 supporting a second protocol (e.g., a cellular network) different from the first protocols supported by the first communication circuit 591.

The communication circuit 590 also includes a third communication circuit 595 that may support a third protocol different from the first and second protocols and may perform short range communication, such as BT and/or BT low energy (BLE). For example, if a BLE protocol supported by the third communication circuit is activated, the NAN protocol supported by the first communication circuit 591 may be activated via the BLE protocol.

The memory 530 may store one or more data received from at least one external electronic device during a DW interval synchronized in a cluster according to activation of the NAN protocol that is supported by the first communication circuit 591.

The one or more data received from the at least one external electronic device may include identification information of the external electronic device and first service information (e.g., a call service, a message service, and/or a video call), which may be provided using NAN by the external electronic device. The one or more data received from the at least one external electronic device may be transmitted including an SDF.

The memory 530 may store information of a plurality of external electronic devices (e.g., phone numbers, account IDs, email addresses, a simple notification service (SNS) ID, and/or MAC information), first service information provided via NAN, and/or matching information obtained by matching information of the plurality of external electronic devices with the first service information.

The memory 530 may store data for execution and/or display of the first service information using NAN according to activation of the first communication circuit 591. The memory 530 may store firmware and/or an application for execution and/or display of the first service information.

Figure 6:
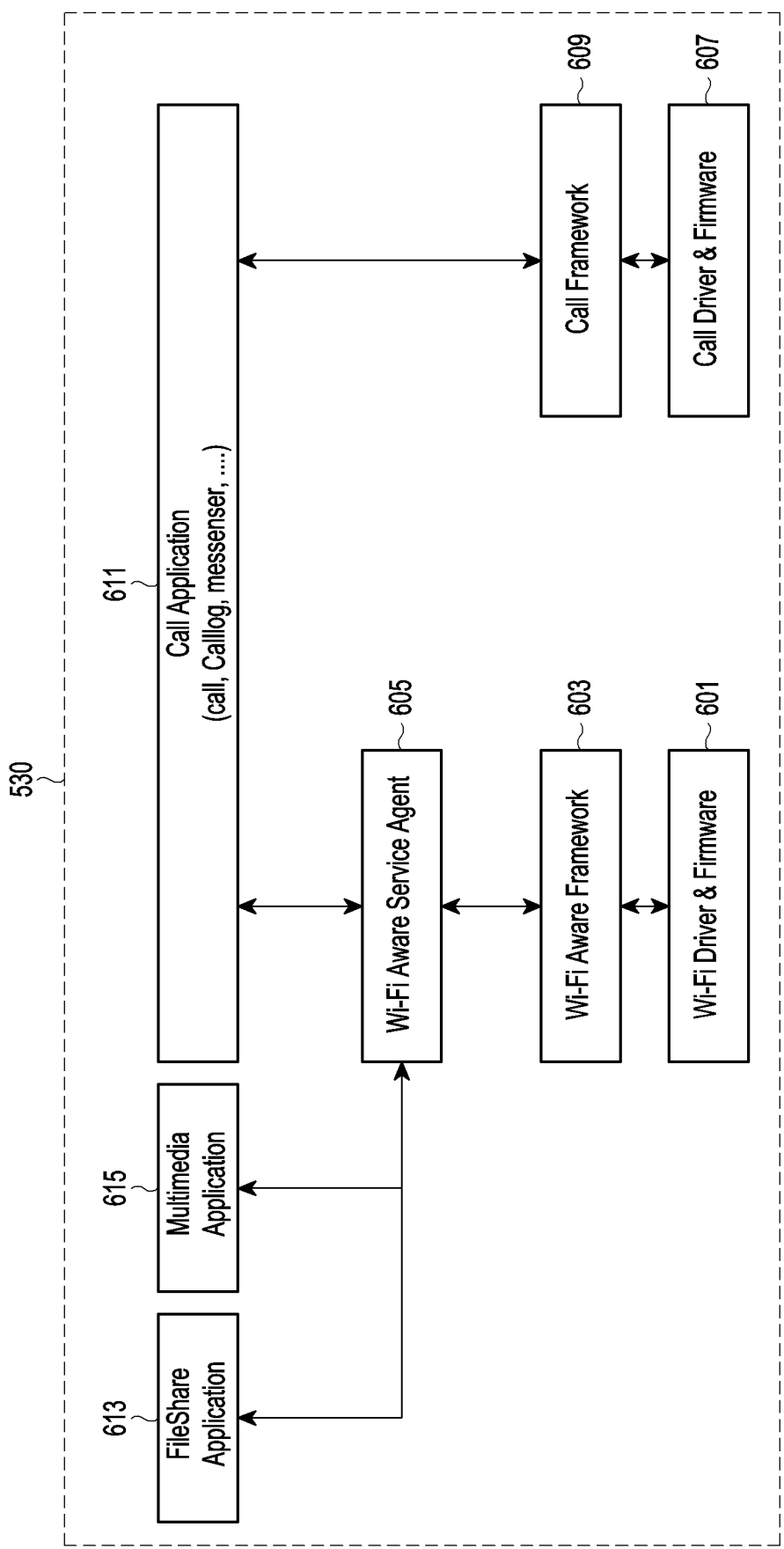
FIG. 6 illustrates a memory structure of an electronic device according to an embodiment.

FIG. 6 illustrates a memory structure of an electronic device according to an embodiment.

Referring to FIG. 6, a memory 530 includes a Wi-Fi driver & firmware 601, a Wi-Fi Aware framework 603, and a Wi-Fi Aware service agent 605, which are for a service provided based on the NAN protocol. The memory 530 includes a call driver & firmware 607, a call framework 609, a call application 611, and a plurality of applications (e.g., a file sharing application 613 and/or a multimedia application 615).

The Wi-Fi driver & firmware 601 may receive a Wi-Fi-related message from a neighboring electronic device, and may transfer Wi-Fi Aware-related message information received from the neighboring electronic device to the Wi-Fi Aware framework 603. The Wi-Fi driver & firmware 601 may transfer a Wi-Fi Aware-related message generated by the Wi-Fi Aware framework 603 to the neighboring electronic device. The transfer function may include broadcast, multicast, and/or unicast.

The Wi-Fi Aware framework 603 may transfer, to the Wi-Fi driver & firmware 601, a command for generating Wi-Fi Aware-related message information in order to perform Wi-Fi Aware-related functions requested from the Wi-Fi Aware service agent 605 and transmitting the Wi-Fi Aware-related message information to the neighboring electronic device. The Wi-Fi Aware framework 603 may receive the Wi-Fi Aware-related message information that is received from the neighboring electronic device via the Wi-Fi driver & firmware 601, may identify a content included in the received Wi-Fi Aware-related message information, and may perform a command therefor. The Wi-Fi Aware framework 603 oversees all functions related to connection to a specific electronic device, and all messages related to Wi-Fi Aware may be processed via the Wi-Fi Aware framework 603.

The Wi-Fi Aware service agent 605 provides a Wi-Fi Aware-related function to a plurality of applications (e.g., the file sharing application 613 and/or the multimedia application 615) installed in the electronic device, and may control a function of the Wi-Fi driver & firmware 601 via the Wi-Fi Aware framework 603. The Wi-Fi Aware service agent 605, which is a module that provides a Wi-Fi Aware function to applications installed in the electronic device, may link Wi-Fi Aware signal information acquired via the Wi-Fi Aware framework 603 and a contacts list received from a contacts application, in order to connect connection possibility information (e.g., signal quality information) of an external electronic device, which is related to information (e.g., an ID of an electronic device) of an external electronic device registered in contacts. For example, if a request for a call connection to external electronic device information selected by a user is received from a contacts application, the Wi-Fi Aware service agent 605 may request a corresponding function from the Wi-Fi Aware framework 603 in order to make a D2D call connection using Wi-Fi Aware based on the NAN protocol.

The call application 611 may be linked to the Wi-Fi Aware service agent 605 in addition to call framework 609 connection. The call application 611 may perform communication connection via the call framework 609 or may perform communication connection via the Wi-Fi Aware service agent 605, based on a network state or state information of the electronic device. If the electronic device is in an airplane mode, the call application 611 may request, from the Wi-Fi Aware service agent 605, information relating to possibility of Wi-Fi Aware access for information (e.g., an ID of an external electronic device) of each external electronic device registered in contacts. The call application 611 may provide a service UI (e.g., a call UI) to a user based on information relating to the possibility of Wi-Fi Aware access, which is received from the Wi-Fi Aware service agent 605. If the user selects the service UI and requests a service, the call application 611 may confirm that the electronic device is in the airplane mode, and may request a D2D service (e.g., a call service) connection based on Wi-Fi Aware from the Wi-Fi Aware service agent 605.

The processor 520 may check an activation state of the NAN protocol supported by the first communication circuit 591.

The processor 520 may selectively activate the NAN protocol by selection of the user. The processor 520 may automatically activate the NAN protocol via a configuration of the electronic device 501.

The processor 520 may activate the NAN protocol in response to a specific condition configured to the electronic device 501. For example, when the electronic device enters the airplane mode, if configured cellular network information is unable to be acquired or if roaming is required, the NAN protocol may not be activated. The processor 520 may display, on a screen, a user experience (UX) such as a pop-up window for obtaining the user's confirmation on activation of the NAN protocol.

When a BLE protocol supported by the third communication circuit 595 is activated, if information received via the BLE protocol, e.g., service request information based on the NAN protocol is received from another electronic device, the processor 520 may activate the NAN protocol. The processor 520 may receive service information provided based on the NAN protocol via the BLE protocol.

If a request for activating the NAN protocol is received from an external electronic device via a server, the processor 520 may activate the NAN protocol. The external electronic device may be an electronic device registered by the same user, or may be an electronic device registered by another user. The processor 520 may automatically activate the NAN protocol or may activate the NAN protocol after confirmation of the user information of the external electronic device, according to the request of the external electronic device.

The processor 520 may store information on a plurality of external electronic devices in the memory 530 of the electronic device 501. Information on the plurality of external electronic devices may include names, contact information (e.g., phone numbers), account IDs, email addresses, SNS IDs, and/or MAC information, and information on the plurality of external electronic devices may be managed via the contacts application.

The processor 520 may receive the information of the plurality of external devices, which is stored in the memory 530, from the server, and store the same. For example, the processor 520 may receive MAC addresses via the server, and may store and manage the received MAC addresses as information on the plurality of external electronic devices.

When the electronic device 501 may use a wired/wireless network, the processor 520 may regularly update and manage information on the plurality of external electronic devices (e.g., phone numbers, account IDs, email addresses, SNS service IDs, and/or MAC information). For example, when a cellular network supported by the electronic device 501 in the second communication circuit 593 is activated, or a legacy Wi-Fi supported by the first communication circuit 591 is activated, if the NAN protocol supported by the first communication circuit 591 is activated, the processor 520 may update information on the plurality of external electronic devices, which is stored in the contacts application of the electronic device.

The processor 520 may update and check, at a predetermined period, information on the plurality of external electronic devices, which is stored in the contacts application of the electronic device 501.

The processor 520 may update, at a predetermined period, a list including information of at least one device, which is related to information on each of the plurality of external electronic devices, which is stored in the contacts application of the electronic device 501.

If the NAN protocol supported by the first communication circuit 591 is activated, the processor 520 may receive data from at least one external electronic device based on the NAN protocol during a DW interval.

If the NAN protocol is activated, and the electronic device 501 is included in a NAN cluster, the processor 520 may receive data from at least one external electronic device within the same cluster during a DW interval. The processor 520 may provide the user with first service information that may be provided using the NAN protocol based on at least one piece of data received from the at least one external electronic device.

The processor 520 may receive, after the NAN protocol is activated, a synchronization beacon frame from each of the at least one external electronic device included in the same NAN cluster during the DW interval. The processor 520 may identify at least one external electronic device having information (e.g., MAC addresses or contact information) included in the synchronization beacon frame, in information on the plurality of external electronic devices, which is stored in the memory 530 of the electronic device 501. The processor 520 may confirm that the identified at least one external electronic device is connectable via the NAN protocol.

The processor 520 may transmit at least one piece of data to the at least one external electronic device included in the NAN cluster, even in an interval other than the DW interval. For example, according to the amount of data transmission, the processor 520 may transmit a part of the data to the at least one external electronic device during the DW interval, and may transmit the remaining data to the at least one external electronic device in an interval other than the DW interval.

The processor 520 may identify an external electronic device, which may transmit or receive the data in an interval other than the DW interval, from among the at least one external electronic device included in the same NAN cluster, and may transmit the data only to the identified external electronic device. The processor 520 may check a designated time range for transmission of the data in the interval other than the DW interval, and may transmit the data to the at least one external electronic device only during the designated time range.

The processor 520 may receive the data from the at least one external electronic device included in the same NAN cluster, even in the interval other than the DW interval. For example, according to the amount of data transmission, the processor 520 may receive a part of the data from the at least one external electronic device during the DW interval, and may receive the remaining data from the at least one external electronic device in the interval other than the DW interval.

The processor 520 may receive the data from an external electronic device designated to transmit or receive the data in the interval other than the DW interval from among the at least one external electronic device. For example, the electronic device may receive the data from the at least one external electronic device only during a time range designated in the interval other than the DW interval.

When displaying, on the display 560, information on at least one external electronic device having transmitted the synchronization beacon frame, the processor 520 may display, as an indication, information indicating that a connection is available via the NAN protocol.

The processor 520 may compare information (e.g., MAC addresses or contact information (e.g., phone numbers)) included in the synchronization beacon frame with the information of the plurality of external electronic devices, which is stored in the memory 530 of the electronic device 501, or may inquire of the server about the information included in the synchronization beacon frame, and may check information of at least one external electronic device connectable via the NAN protocol, in information on the plurality of external electronic devices, which is stored in the electronic device 501, based on an answer to the inquiry.

FIG. 7 illustrates beacon frame synchronization of an electronic device according to an embodiment.

Referring to FIG. 7, if the NAN protocol supported by the first communication circuit 591 of the electronic device 501 is activated, a synchronization beacon frame may be transmitted to or received from at least one external electronic device included in the NAN cluster during a DW interval. The synchronization beacon frame includes a broadcasting address A1, a MAC address A2 of the electronic device having transmitted the synchronization beacon frame, a cluster ID A3 for identification of the NAN cluster, and a time stamp for a beacon frame.

The processor 520 may receive data from at least one external electronic device during the DW interval, and may check, based on the received data, information of at least one external electronic device which may provide first service information by using the NAN protocol, in information on a plurality of external electronic devices, which is included in the electronic device 501. The data received from the at least one external electronic device may be included in an SDF transmitted by the at least one external electronic device.

The first service information of the data may be included in an extra field of the SDF, and a separate vendor specific attribute may be defined in the SDF in order to include the first service information of the data. The extra field of the SDF may be an extra field of a service descriptor attribute (SDA). The SDA is an attribute of the SDF, and the SDA may include an extra field, in which a matching filter field, a service ID field, and service-specific information may be further stored, thereby including the first service information of the data in the extra field. The data received from the at least one external electronic device may include identification information of the external electronic device and/or the first service information that may be provided using the NAN protocol by the external electronic device.

The identification information of the external electronic device, which is included in the data received from the at least one external electronic device, may include direct information, such as a user's account name, server ID, name, contact information, email address, or MAC address, or at least a part of the direct information.

The identification information of the external electronic device may include indirect information, such as a code, a token, or an encrypted sequence, which allows for acquisition of the direct information via a server. If the electronic device 501 is able to use an external network, the processor 520 may transmit indirect information, such as a specific key, a code, a token, and/or an encrypted sequence, to the server, and may acquire, from the server, information enabling identification of the external electronic device, which includes direct information.

If the electronic device 501 and a neighboring external electronic device are separately stored in respective contacts applications thereof, the processor 520 may have received, in advance, indirect information, such as a specific key, a code, or a token, via the server in order to store the same, and may detect direct information stored in the contacts application, based on the information allowing identification of the external electronic device, which includes indirect information, detected from the SDF without the server connection using the external network.

The first service information included in the data received from the at least one external electronic device may be provided as a service list, and may include a Wi-Fi Aware service ID. For example, if a call service is available using the NAN protocol, the first service information may include a Wi-Fi Aware calling service ID.

If the NAN protocol is activated, the processor 520 may generate data including first service information which may be provided using the NAN protocol by the electronic device 501, and identification information (e.g., a MAC address or contact information) of the electronic device 501. The processor 520 may transmit the generated data to at least one external electronic device within the same NAN cluster during the DW interval. The processor 520 may transmit the generated data included in the SDF.

The processor 520 may also transmit or receive the data in an interval other than the DW interval.

If at least one piece of data is received during the DW interval, the processor 520 may check information of at least one external electronic device, which includes identification information of the external electronic device included in the data, in information on the plurality of external electronic devices, which is stored in the electronic device 501. The processor 520 may identify at least one external electronic device corresponding to information of the at least one external electronic device, as an external electronic device available for a service by using the NAN protocol, If data is received during the DW interval, the processor 520 may check, based on the first service information included in the data, the first service information using the NAN protocol, which may be provided by the at least one external electronic device.

The processor 520 may identify, via a matching filter, whether the first service information using the NAN protocol, which is included in the data received from the at least one external electronic device, includes the first service information that may be provided using the NAN protocol by the electronic device 501. For example, the processor 520 may identify, via the matching filter, whether the first service information included in the data is service information supportable by the electronic device 501.

FIG. 8A illustrates a matching filter according to an embodiment.

Referring to FIG. 8A, based on a filter value and a length included in each of fields of a matching filter, it may be identified that first service information included in data received from at least one external electronic device is service information supportable by the electronic device 501.

For example, a scenario in which a call service using a NAN protocol is possible based on the data from the at least one external electronic device, and contact information is checked, is described as follows.

Matching_filter_rx registered in a publish function of the electronic device 501 may include a plurality of pairs including a first pair indicating an identification of whether a NAN data path is available, a second pair indicating an identification of whether a NAN call service is available, and/or a third pair indicating to check contact information. For example, a value of "<1, 1>" may be stored as a first pair value, a value of "<1, 2>" may be stored as a second pair value, and a value of "<0>" may be stored as a third pair value.

If data (e.g., matching filter field in Subscribe message) including "<1, 1><1, 1><6, 012345>" is received from a first external electronic device of the at least one external electronic device, the processor 520 may compare "<1, 1><1, 1><6, 012345>" included in the data (e.g., matching filter field in Subscribe message) received from the first external electronic device with "<1, 1><1, 2><0>" stored in matching_filter_rx registered in the publish function of the electronic device 501.

According to a result of comparing "<1, 1><1, 1><6, 012345>" with "<1, 1><1, 2><0>", the second pair values are different, which indicates that the first external electronic device supports a service differing from the call service that is supported by the electronic device, and therefore the processor 520 may identify that services do not match.

If data including "<1, 1><1, 2><6, 012346>" is received from a second external electronic device of the at least one external electronic device, the processor 520 may compare "<1, 1><1, 2><6, 012345>" included in the data received from the second external electronic device with "<1, 1><1, 2><0>" stored in matching_filter_rx registered in the publish function of the electronic device 501.

According to a result of comparing "<1, 1><1, 2><6, 012345>" with "<1, 1><1, 2><0>", up to second pair values are identical, and therefore the processor 520 may identify that the second external electronic device supports the call service that is supported by the electronic device 501. If a pair value is "<0>", the value refers to a wild card and indicates that all are available. Therefore, if the third pair value is "<0>", the value indicates that it does not matter which contact information is received.

FIG. 8B illustrates a matching filter according to an embodiment.

Referring to FIG. 8B, for B1, all pairs included in data (e.g., matching filter field in Subscribe message) received from an external electronic device include a value of "<0>", which is a wild card, and therefore the processor 520 may identify that services supported by the electronic device and the external electronic device match, even if "<1,1><1,2><1,3><1,4><1,5>" is stored in matching_filter_rx registered in the publish function of the electronic device 501.

For B2, the value of "<0>", which is a wild card, is stored in all pairs included in matching_filter_rx registered in the publish function of the electronic device 501, and therefore the processor 520 may identify that services supported by the electronic device and the external electronic device match, regardless of multiple pair values included in the data received from the external electronic device.

For B3, multiple pair values of "<1,1><1,2><1,3><1,4><1,5>" stored in matching_filter_rx registered in the publish function of the electronic device 501 and multiple pair values of "<1,1><1,2><1,3><1,4><1,5>" included in the data (e.g., matching filter field in Subscribe message) received from the external electronic device are identical, and therefore the processor 520 may identify that services supported by the electronic device and the external electronic device match.

For B4, when comparing multiple pair values of "<1,1><1,2><1,1><1,4><1,5>" stored in matching_filter_rx registered in the publish function of the electronic device 501 with multiple pair values of "<1,1><1,2><1,3><1,4><1,5>" included in the data received from the external electronic device, the third pair values are not identical, and therefore the processor 520 may identify that services supported by the electronic device and the external electronic device do not match.

The processor 520 may compare information (e.g., contact information, an account ID, an email address, an SNS ID, and/or a MAC address) allowing identification of an external electronic device, which is included in the data received from the at least one external electronic device, with information of an external electronic device, which is stored in the electronic device 501, in order to update the information of the external electronic device that is stored in the electronic device 501.

The processor 520 may check connection possibility information for performing a service with at least one external electronic device in the same cluster.

The connection possibility information may include reference information indicating an identification on a possibility of connection to the at least one external electronic device by using the NAN protocol. The reference information may include at least one of a received signal strength indicator (RSSI) signal strength, information relating to a distance between electronic devices, the number of Wi-Fi Aware hoppings, a Wi-Fi Aware cluster retention time, and stability information using a sensor of the electronic device. The RSSI signal strength may be calculated using a synchronization beacon frame or SDF received during a DW, and the information relating to the distance between the electronic devices may be detected using a ranging technology of NAN. The number of Wi-Fi Aware hoppings and the Wi-Fi Aware cluster retention time may be detected from the synchronization beacon frame or SDF received during the DW.

When identifying the possibility of a connection to the at least one external electronic device by using the NAN protocol, based on the connection possibility information, the processor 520 may differentially apply a connection possibility reference to each service type using the NAN protocol. For example, for a communication connection requiring a high level of stability, such as a call service, all reference information may be applied, but for a communication connection requiring a relatively low level of stability, such as a message service, only a part of the reference information may be applied.

The processor 520 may designate a service connectable range based on connection possibility information indicating the possibility of connection to the at least one external electronic device by using the NAN protocol.

Figure 9:
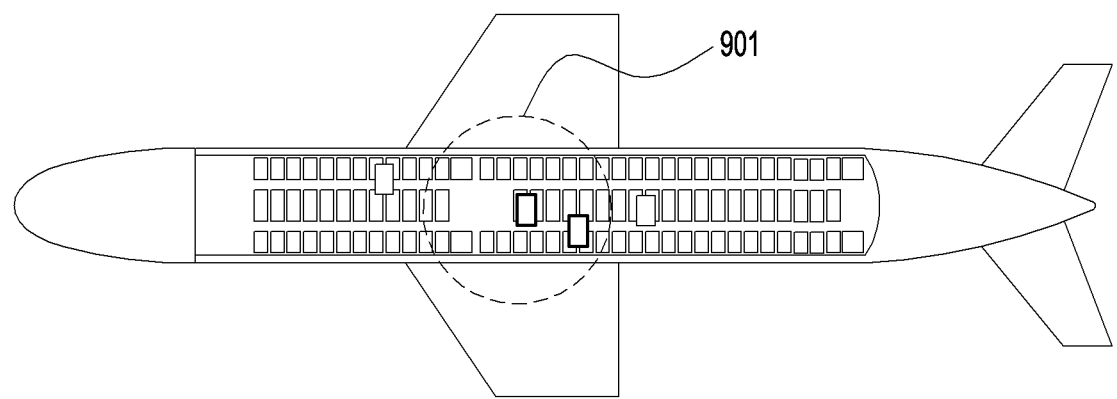
FIG. 9 illustrates a service connectable range designation according to an embodiment.

FIG. 9 illustrates a service connectable range designation according to an embodiment.

Referring to FIG. 9, in a second communication state in which a protocol supported by the second communication circuit 593 is deactivated, and a NAN protocol supported by the first communication circuit 591 is activated, a user of the electronic device 501, who is onboard an airplane, may designate, by using the NAN protocol, a call connection range 901 up to the range (e.g., a distance and/or seat), where a companion boards, or up to the range where at least one external electronic device stored in the electronic device 501 is located. If the at least one external electronic device stored in the electronic device 501 is relocated, the call connection range may be actively changed. For example, in the airplane, while limiting the call range to an electronic device of a companion located nearby, the user may change the call connection range if the companion moves in the airplane. The call connection range 901 may be designated up to the range of at least one external electronic device, in which a communication circuit other than the first communication circuit 591 supporting the NAN protocol, e.g., the third communication circuit 593 supporting a BLE protocol, is located.

The processor 520 may identify whether identification information of at least one external electronic device having transmitting data during a DW interval is stored in the memory 530, and may store, in the memory 530, information obtained by matching the identification information of the at least one external electronic device with the received data.

If a request for performing a service using the NAN protocol is received, the processor 520 may display information of at least one external electronic device that performs the service, based on the matched and stored information.

The processor 520 may receive at least one piece of data from at least one external electronic device in the same cluster during the DW, and may match identification information of the at least one external electronic device, which is detected from the data, with at least one piece of first service information in order to store the matched information in the memory 530.

If the NAN protocol is activated, and a SDF or a frame (e.g., a synchronization beacon frame) including identification information of at least one external electronic device is received from the external electronic device in the same cluster during the DW, the processor 520 may detect, in the frame, the identification information (e.g., an MAC address) or contact information of the at least one external electronic device, and may detect, in the memory 530, at least one piece of first service information corresponding to the identification information of the at least one external electronic device, in order to display the detected information on the display 560.

Based on information (e.g., contact information, account IDs, email addresses, SNS IDs, and/or MAC addresses) of a plurality of external electronic devices, which is stored in the electronic device, the electronic device may display information of at least one external electronic device, for which the NAN protocol is activated, and first service information that may be provided using the NAN protocol by the at least one external electronic device.

The processor 520 may detect at least one piece of identification information (e.g., a MAC address or contact information) of at least one external electronic device from the data received from the at least one external electronic device. The processor 520 may detect information of at least one external electronic device that matches information on the plurality of external electronic devices, which is stored in the contacts application of the electronic device 501. The processor 520 may display, on the display 560, the detected information of at least one external electronic device and/or at least one piece of first service information that may be provided using the NAN protocol from information of the at least one external electronic device.

the processor 520 may display, on the display 560, first service information provided using the NAN protocol by the at least one external electronic device, based on at least one piece of data received from at least one external electronic device during the DW and/or information on a possibility of connection to the at least one external electronic device.

If the NAN protocol is activated, the processor 520 may display, on the display 560, the first service information that may be provided using the NAN protocol, together with information of at least one external electronic device corresponding to at least one external electronic device having transmitted the data, in information on the plurality of external electronic devices, which is stored in the electronic device 501.

In a first communication state in which the protocol supported by the second communication circuit 593 is activated, and the NAN protocol supported by the first communication circuit 591 is activated, if information on the plurality of external electronic devices, which is stored in the electronic device 501, is requested to be displayed, the processor 520 may display information on the plurality of external electronic devices, which is included in the electronic device 501, on the display 560.

While displaying information on the plurality of external electronic devices, the processor 520 may display second service information that may be provided using the activated protocol supported by the second communication circuit 593, together with the first service information that may be provided using the activated NAN protocol, in the vicinity of where information of the at least one external electronic device included in the plurality of external electronic devices is displayed. The processor 520 may distinguish and display the first service information and the second service information by using color or indication.

If the protocol supported by the second communication circuit 593 is deactivated, the processor 520 may automatically activate the NAN protocol.

In a second communication state in which the protocol supported by the second communication circuit 593 is deactivated, and the NAN protocol is activated, if information on the plurality of external electronic devices, which is stored in the electronic device 501, is requested to be displayed, the processor 520 may display information on the plurality of external electronic devices, which is included in the electronic device 501.

While displaying information on the plurality of external electronic devices, which is stored in the electronic device 501, on the display 560, the processor 520 may display the first service information that may be provided using the activated NAN protocol, in the vicinity of where information of the at least one external electronic device included in information on the plurality of external electronic devices.

In the first communication state in which the protocol supported by the second communication circuit 593 is activated, and the NAN protocol supported by the first communication circuit 591 is activated, the processor 520 may display the second service information with the first service information, and in the second communication state in which the protocol supported by the second communication circuit 593 is deactivated, and only the NAN protocol supported by the first communication circuit 591 is activated, the processor 520 may replace and display the first service information at a location where the second service information is displayed.

In the second communication state in which the protocol supported by the second communication circuit 593 is deactivated, and only the NAN protocol supported by the first communication circuit 591 is activated, the processor 520 may display, on the display 560, a menu (e.g., a sharing menu) that may use the NAN protocol, and may display information indicating that a function using the protocol supported by the second communication circuit 593 cannot be used.

In the second communication state in which the protocol supported by the second communication circuit 593 is deactivated, and the NAN protocol supported by the first communication circuit 591 is activated, if information on the plurality of external electronic devices, which is stored in the electronic device 501, is requested to be displayed, the processor 520 may display, on the display 560, only information of the at least one external electronic device having transmitted the at least one piece of data (e.g., an SDF) in the information on the plurality of external electronic devices.

While displaying only information of the at least one external electronic device on the display 560, the processor 520 may display the first service information in the vicinity of where information of the at least one external electronic device is displayed.

In the second communication state in which the protocol supported by the second communication circuit 593 is deactivated, and the NAN protocol supported by the first communication circuit 591 is activated, the processor 520 may display the first service information and information of the at least one external electronic device having transmitted the at least one piece of data, in a partial area (e.g., a partial area of a home screen) of a screen of the display 560.

In the second communication state in which the protocol supported by the second communication circuit 593 is deactivated, and the NAN protocol supported by the first communication circuit 591 is activated, the processor 520 may classify and display methods for providing service information, based on at least one among the at least one piece of data including first service information received from the at least one external electronic device, connection possibility information (e.g., a signal strength) allowing an identification of a possibility of connection to the at least one external electronic device by using the NAN protocol, and/or a ranging technology of NAN. When the protocol supported by the second communication circuit 593 is deactivated, the processor 520 may display a selection option for activating the NAN protocol supported by the first communication circuit 591, on the screen of the display 560.

While displaying the first service information that may be provided by at least one external electronic device during the DW, if a connection of the first service information is selected, the processor 520 may perform a first service, using the NAN protocol, by connecting to a selected external electronic device.

In order to perform data communication with the selected external electronic device in an interval other than the DW by using the NAN protocol, the processor 520 may perform the first service with the selected external electronic device by performing NDP setup.

The processor 520 may store information transmitted or received while the service is being performed via the NAN protocol supported by the first communication circuit 591, and then if the protocol supported by the second communication circuit 539 is activated, continuity of the service may be secured by updating the information stored in a corresponding server. For example, if the processor 520 performs an email service via the NAN protocol, an email application may store records of file transmission or message transmission performed via D2D communication by using the NAN protocol, and if a cellular network connection becomes possible, the processor 520 may update the records of file transmission or message transmission, which are stored in an email server, in order to secure continuity of the email service.

The processor 520 may provide a service similar to that provided via the protocol supported by the second communication circuit 593 by activating the NAN protocol supported by the first communication circuit 591. For example, even when the electronic device is in an airplane mode, the user may be able to quickly and easily establish a call connection with a companion sitting far away in the airplane, and the user may easily and intuitively use a new service with the same user experience via UX for a call based on an existing cellular network.

When traveling abroad, communication with a companion in a short distance may be possible without a roaming connection or a Wi-Fi AP connection, and if a user is away from a companion on a busy street, in a busy store, or while moving using transportation, an easy and quick communication connection with the companion can be made via a communication connection, by activating the NAN protocol supported by the first communication circuit 591.

In an environment, such as a security facility that intentionally restricts access to a cellular network, a user may easily, quickly, and intuitively communicate with nearby users, and may use a new service without aversion via the user experience familiar with the existing UX.

When taking a business trip abroad, in order to exchange large files with foreign buyers, the files may be transmitted and received in a fast, safe, and secure state based on the same usability as message transmission, regardless of each service subscription status.

According to an embodiment, an electronic device may include a first communication circuit supporting a NAN protocol, a second communication circuit supporting a second protocol different from the NAN protocol, a memory, and at least one processor operatively connected to the first communication circuit, the second communication circuit, and the memory. The at least one processor is configured to activate the NAN protocol supported by the first communication circuit, and receive data from at least one external electronic device via the first communication circuit during a discovery window interval synchronized in a cluster via the first communication circuit, identify whether identification information of the at least one external electronic device having transmitted the data is stored in the memory, if the identification information of the at least one external electronic device is stored, store information, which is obtained by matching at least a part of the received data with the identification information, in the memory, and if a request for performing a service is received, display information of the at least one external electronic device configured to perform the service, on the basis of the matched and stored information.

The data may include the identification information of the external electronic device and service information that may be provided using the NAN protocol by the external electronic device.

The processor may be configured to, if the NAN protocol is activated, generate data including identification information of the electronic device and service information that may be provided using the NAN protocol by the electronic device, and transmit the generated data to the at least one external electronic device during the discovery window interval via the first communication circuit.

The processor may be configured to identify connection possibility information for performing the service with at least one external electronic device, and to display the identified connection possibility information.

The processor may be configured to receive the data from the at least one external electronic device in an interval other than the discovery window interval.

The processor may be configured to identify, based on the received data, information of at least one external electronic device that provides service information matching the service information that may be provided using the NAN protocol by the electronic device.

The processor may be configured to, in a first communication state where the second protocol supported by the second communication circuit is activated, and the NAN protocol supported by the first communication circuit is activated, receive a request for displaying information of at least one external electronic device, which is stored in the electronic device, and in response to the request for displaying, display service information provided using the second protocol and service information provided using the NAN protocol, in the vicinity of where the information of the at least one external electronic device is displayed.

The processor may be configured to in a second communication state where the second protocol supported by the second communication circuit, and the NAN protocol supported by the first communication circuit is activated, receive a request for displaying information on a plurality of external electronic devices, which is stored in the electronic device, and to display the service information provided via the NAN protocol, in the vicinity of where information of the at least one external electronic device is displayed, in response to the request for displaying.

The electronic device may further include a third communication circuit that is operatively connected to the processor and supports a BLE protocol, wherein the processor is configured to, in a state where the BLE protocol is basically activated, activate the NAN protocol supported by the first communication circuit on the basis of information received via the third communication circuit, and to receive, via the BLE protocol, service information provided via the NAN protocol.

The processor may be configured to, if service information displayed in the vicinity of where information of the at least one external electronic device is displayed is selected, perform a service by establishing communication with the external electronic device via the NAN protocol of the first communication circuit.

According to an embodiment, an electronic device may include a first communication circuit supporting a NAN protocol, a second communication circuit supporting a second protocol different from the NAN protocol, a memory, and at least one processor operatively connected to the first communication circuit, the second communication circuit, and the memory. The at least one processor is configured to, if deactivation of the second protocol supported by the second communication circuit is identified, activate the NAN protocol supported by the first communication circuit, receive data from at least one external electronic device during a discovery window interval synchronized in a cluster, based on the data, identify information of the at least one external electronic device, in information on a plurality of external electronic devices, which is stored in the memory, and service information that can be provided using the NAN protocol by the at least one external electronic device, and in response to a request for displaying the service information, display the information of the at least one external electronic device and the service information that may be provided using the NAN protocol by the at least one external electronic device.

The received data may include identification information of the external electronic device and the service information that may be provided using the NAN protocol by the external electronic device.

Figure 10:
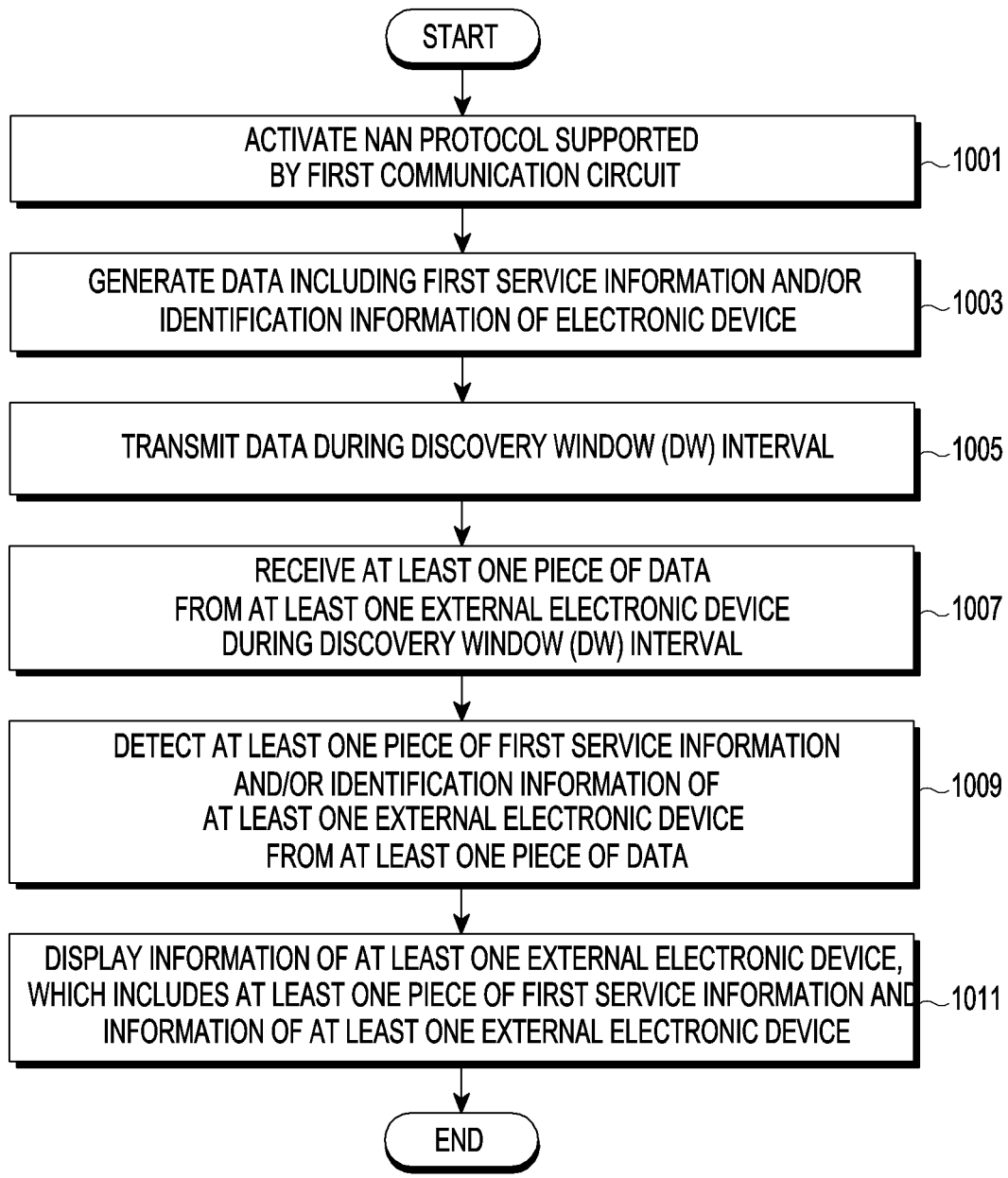
FIG. 10 is a flowchart illustrating a method for providing service information by an electronic device according to an embodiment.

FIG. 10 is a flowchart illustrating a method for describing operations of providing service information by an electronic device according to an embodiment.

Referring to FIG. 10, in step 1001, an electronic device activates a NAN protocol supported by a first communication circuit. If the NAN protocol is activated, the electronic device may be included in a NAN cluster with at least one external electronic device, for which the NAN protocol has been activated.

In step 1003, the electronic device generates data including first service information that may be provided using the NAN protocol and information (e.g., a MAC address or contact information) for identification of the electronic device.

The electronic device may generate data including a message for inquiring of a first service supportable via the NAN protocol by an external electronic device and information for identification of the electronic device. For example, if the message for inquiring of the first service supportable via the NAN protocol is received, the external electronic device may generate a list of first services supportable via the NAN protocol by the external electronic device and may transmit the generated list to the electronic device, in response to the received message.

In step 1005, the electronic device transmits the data to at least one external electronic device included in the NAN cluster during a DW interval. The electronic device may transmit the data included in an SDF. The electronic device may transmit the data to at least one external electronic device included in the NAN cluster during the DW interval, the data including a further availability window (FAW) map used to report a location estimation value of the electronic device. The electronic device may transmit the data to at least one external electronic device included in the NAN cluster in an interval other than the DW interval. For example, according to the amount of data transmission, the electronic device may transmit a part of the data to the at least one external electronic device during the DW interval, and may transmit the remaining data to the at least one external electronic device in an interval other than the DW interval.

The electronic device may identify an external electronic device, which may transmit or receive the data in an interval other than the DW interval, from among at least one external electronic device included in the NAN cluster, and may transmit the data only to the identified external electronic device. The electronic device may also check a designated time range for transmission of the data in the interval other than the DW interval, and may transmit the data to the at least one external electronic device only during the designated time range.

In step 1007, the electronic device receives data from at least one external electronic device included in the NAN cluster during the DW interval. The electronic device may receive the SDF including the data. The electronic device may receive the data from at least one external electronic device included in the NAN cluster in an interval other than the DW interval. For example, according to the amount of data transmission, the electronic device may receive a part of the data from the at least one external electronic device during the DW interval, and may receive the remaining data from the at least one external electronic device in the interval other than the DW interval. The electronic device may receive the data from an external electronic device designated to transmit or receive the data in the interval other than the DW interval from among the at least one external electronic device. The electronic device may receive the data from the at least one external electronic device only during a time range designated in the interval other than the DW interval.

In step 1009, based on the data received from the at least one external electronic device, the electronic device detects identification information (e.g., a MAC address or contact information) of the at least one external electronic device and/or at least one piece of first service information that may be provided using the NAN protocol by the at least one external electronic device.

In step 1011, the electronic device displays information of the at least one external electronic device and/or information on the at least one external electronic device, which includes the at least one piece of the first service information. The electronic device may distinguish and display at least one external electronic device that has transmitted the received data, in information on a plurality of external electronic devices, which is stored in the electronic device.

Figure 11:
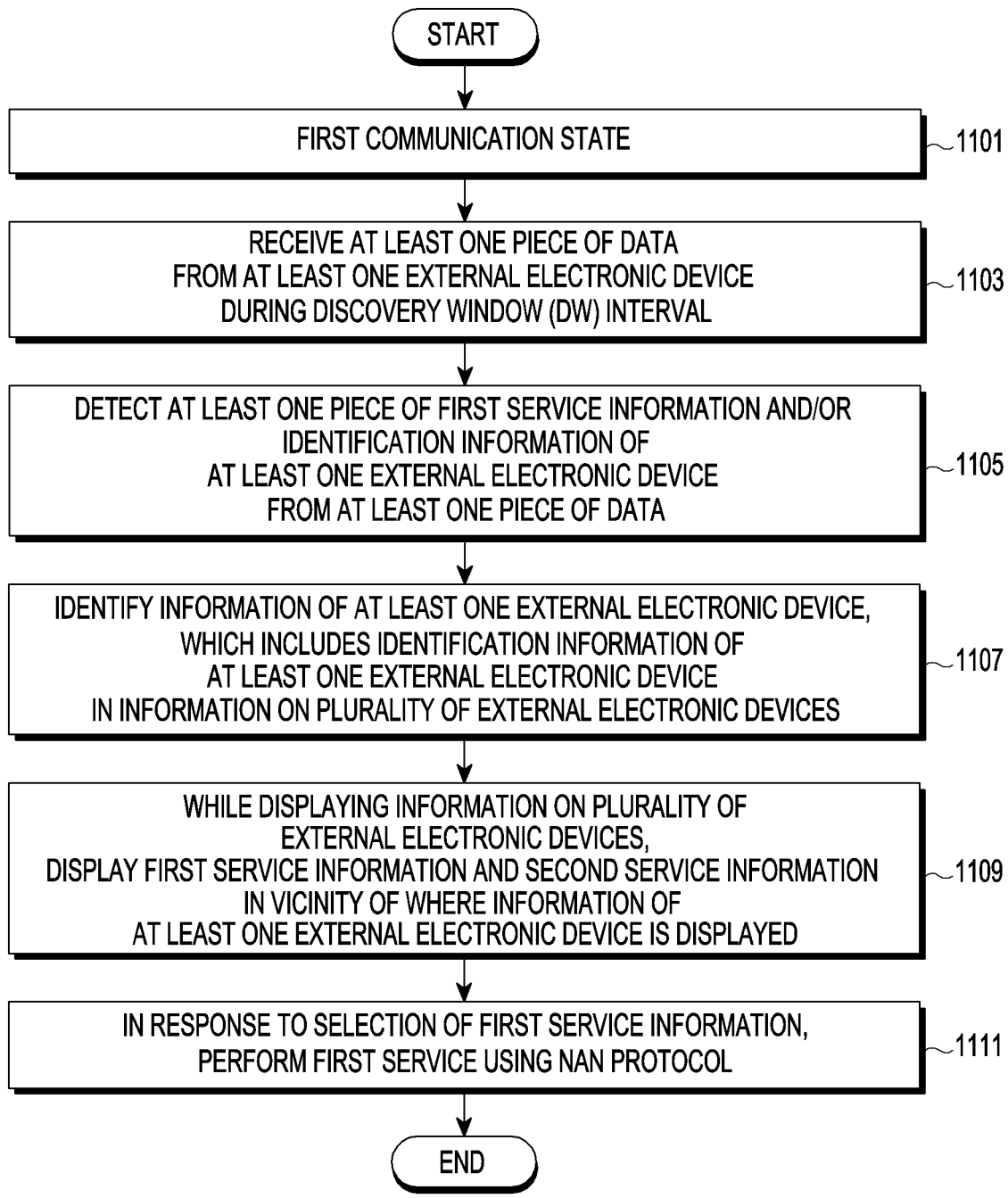
FIG. 11 is a flowchart illustrating a method for providing service information by an electronic device according to an embodiment.

FIG. 11 is a flowchart illustrating a method for providing service information by an electronic device according to an embodiment.

Referring to FIG. 11, in step 1101, the electronic device identifies a first communication state in which a protocol supported by a second communication circuit is activated, and a NAN protocol supported by a first communication circuit is activated based on activation of a BLE protocol or user selection.

In step 1103, the electronic device receives data from at least one external electronic device included in the NAN cluster during a DW interval. The electronic device may receive an SDF including the data. The electronic device may receive the data from at least one external electronic device included in the NAN cluster in an interval other than the DW interval. For example, according to the amount of data transmission, the electronic device may receive a part of the data from the at least one external electronic device during the DW interval, and may receive the remaining data from the at least one external electronic device in the interval other than the DW interval. The electronic device may receive the data from an external electronic device designated to transmit or receive the data in the interval other than the DW interval from among the at least one external electronic device. The electronic device may receive the data from the at least one external electronic device only during a time range designated in the interval other than the DW interval.

In step 1105, the electronic device detects, from the received at least one piece of data, identification information (e.g., a MAC address or contact information) of the at least one external electronic device, and/or first service information (e.g., a call service, a message service, and/or a video call) which may be provided using the NAN protocol by the at least one external electronic device.

In step 1107, if it is requested to display information on a plurality of external electronic devices, which is stored in the electronic device (e.g., if a contacts application is selected), the electronic device checks information of at least one external electronic device, which includes identification information (e.g., a MAC address or contact information) of the at least one external electronic device, in the information on the plurality of external electronic devices.

In step 1109, in the first communication state, if it is requested to display information on the plurality of external electronic devices, which is stored in the electronic device, the electronic device distinguishes and displays, on a display, the first service information and second service information that may be provided using the protocol supported by the second communication circuit, in the vicinity of where information of the at least one external electronic device included in the plurality of external electronic devices is displayed. The electronic device may distinguish and display the first service information and the second service information via various visual objects, such as texts, colors, shapes, and/or icons.

In step 1111, if the first service information displayed in the vicinity of where information of the at least one external electronic device is displayed is selected, the electronic device performs the first service with the selected external electronic device by using the NAN protocol in response to the selection. The electronic device may perform the first service with the selected external electronic device in an interval other than the DW interval based on execution of an NDP setup.

Figure 12A:
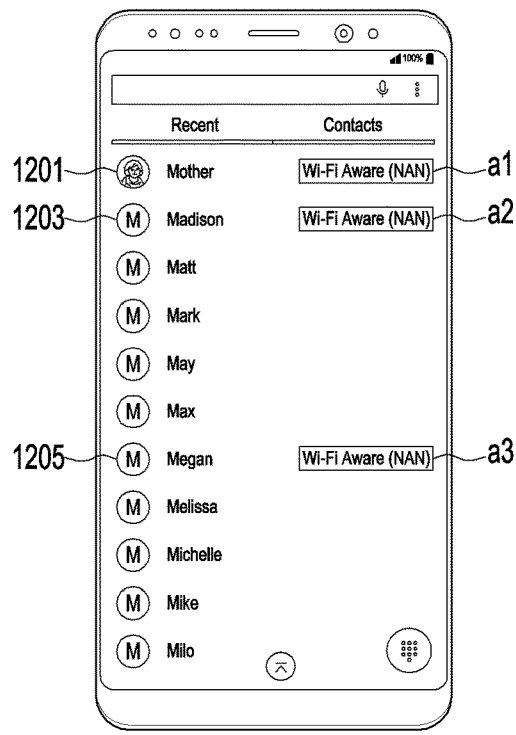
FIGS. 12A, 12B, and 12C illustrate operations of providing service information by an electronic device according to an embodiment.
Figure 12B:
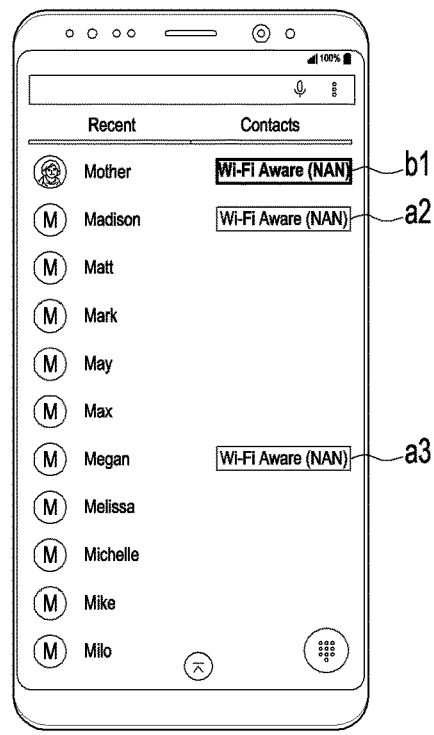
Figure 12C:
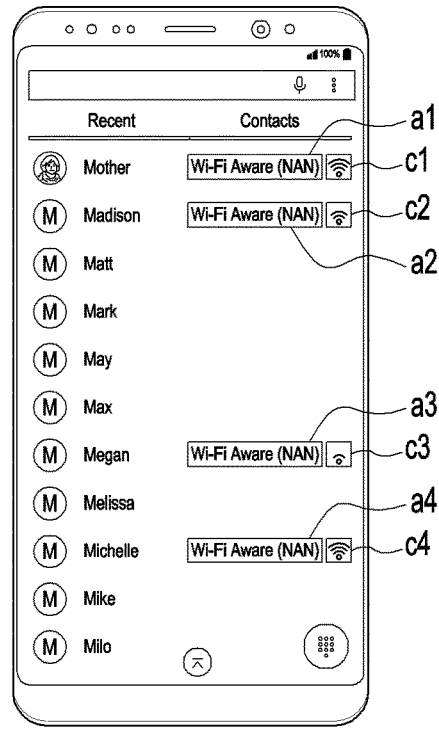

FIGS. 12A, 12B, and 12C illustrate operations of providing service information by an electronic device according to an embodiment.

Referring to FIG. 12A, in a first communication state in which a protocol supported by a second communication circuit is activated, and a NAN protocol supported by a first communication circuit is activated, while a contacts application, in which information on a plurality of external electronic devices is stored, is selected and information (e.g., names) of the plurality of external electronic devices is being displayed, the electronic device may display indications a1, a2, and/or a3 notifying that the NAN protocol is available, in the vicinity of where respective information 1201, 1203, and/or 1205 of at least one external electronic device that may provide the first service by using the NAN protocol is displayed. While the indications notifying that the NAN protocol is available are displayed in text a1, a2, and a3, the indications may be displayed differently using various visual objects, such as shapes, colors, images, and/or icons, in addition to text.

Referring to FIG. 12B, in the first communication state in which the protocol supported by the second communication circuit is activated, and the NAN protocol supported by the first communication circuit is activated, when the electronic device displays, on a display, first indications b 1, a2, and a3 indicating that the NAN protocol is available, in the vicinity of where information 1201, 1203, and 1205 of at least one external electronic device is displayed, the electronic device may distinguish and display the first indication b 1 having a high possibility of connection to at least one external electronic device and the first indications a2 and/or a3 having a low possibility of connection to at least one external electronic device. For example, the electronic device may distinguish and display connection possibilities based on a recent use history or a signal strength for each of at least one external electronic device corresponding to the information 1201, 1203, and 1205 of at least one external electronic device. The electronic device may distinguish and display the first indication b 1 having a high connection possibility by using various visual objects, such as texts, colors, shapes, images, and/or icons.

Referring to FIG. 12C, in the first communication state in which the protocol supported by the second communication circuit is activated, and the NAN protocol supported by the first communication circuit is activated, when the electronic device displays first indications a1, a2, a3, and a4 indicating that the NAN protocol is available, in the vicinity of where information 1201, 1203, and 1205 of at least one external electronic device is displayed, the electronic device may further display connection possibility information, such as a signal strength, by using second indications c1, c2, c3, and/or c4 in the vicinity of where the respective indications a1, a2, a3, and/or a4 are displayed, in order to provide notification on the possibility of connection to at least one external electronic device. The electronic device may distinguish and display the second indications by using various visual objects, such as texts, colors, shapes, images, or icons.

Figure 13A:
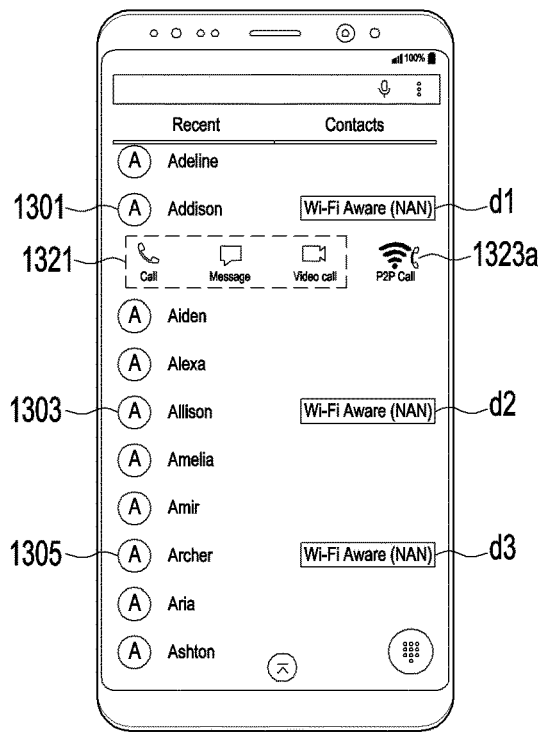
FIGS. 13A, 13B, and 13C illustrate operations of providing service information by an electronic device according to an embodiment.
Figure 13B:
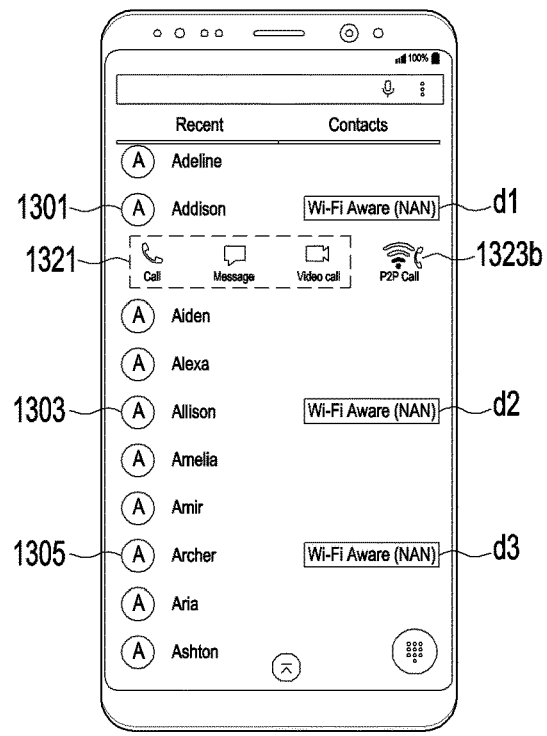
Figure 13C:
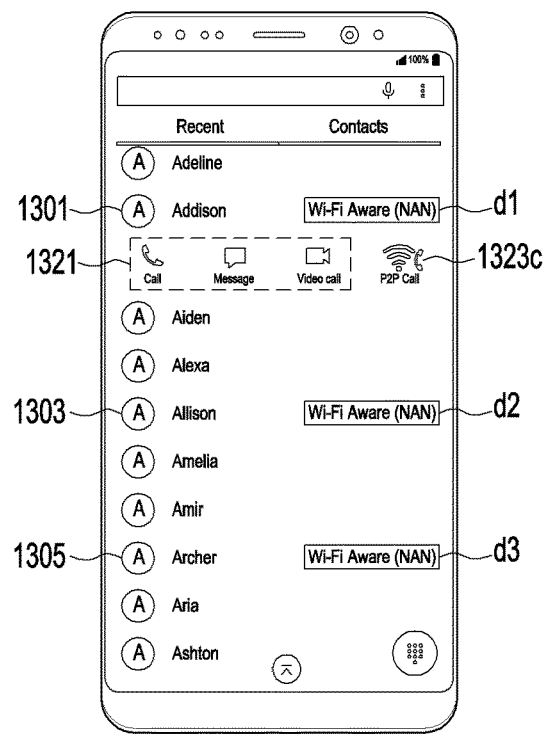

FIGS. 13A, 13B, and 13C illustrate operations of providing service information by an electronic device according to an embodiment.

Referring to FIGS. 13A to 13C, for an electronic device in the first communication state in which the protocol supported by the second communication circuit is activated, and the NAN protocol supported by the first communication circuit is activated, if a contacts application is selected by a user from among various applications associated with display of information on the plurality of external electronic devices, which is stored in the electronic device, the electronic device may display information (e.g., names) of the plurality of external electronic devices via the contacts application. While displaying information of the plurality of external electronic devices, the electronic device may detect, based on data received from at least one external electronic device during a DW interval, information 1301, 1303, and 1305 of at least one external electronic device that may provide a first service by using the NAN protocol, and may display indications d1, d2, and d3 notifying that the NAN protocol is available, in the vicinity of where the respective information 1301, 1303, and 1305 of the at least one external electronic device is displayed. If information 1301 of one external electronic device is selected, the electronic device may display communication service information 1323a to 1323c that may be provided using the activated NAN protocol and second service information 1321 (e.g., a communication service, a message service, and/or a video call service) that may be provided using the protocol supported by the second communication circuit.

When displaying communication service information 1312a to 1323c, the electronic device may distinguish and display the communication service information by using different signal strength indications according to respective connection possibilities.

Figure 14:
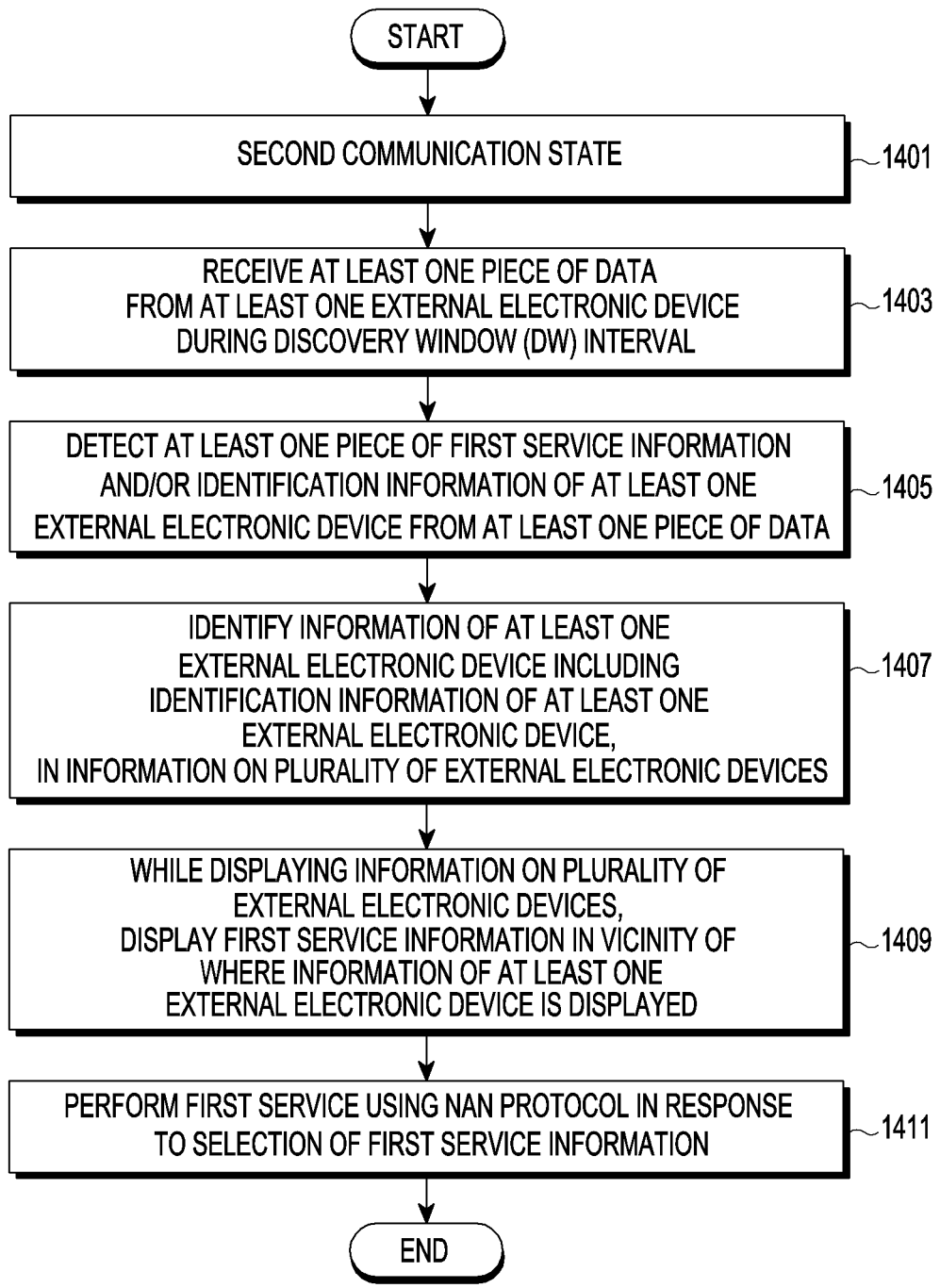
FIG. 14 is a flowchart illustrating a method for providing service information by an electronic device according to an embodiment.

FIG. 14 is a flowchart illustrating a method for providing service information by an electronic device according to an embodiment.

Referring to FIG. 14, in step 1401, the electronic device identifies that a second communication state in which a protocol supported by a second communication circuit is deactivated, and that a NAN protocol supported by a first communication circuit is activated based on a BLE protocol or user selection.

In step 1403, the electronic device receives data from at least one external electronic device included in a NAN cluster during a DW interval. The electronic device may receive an SDF including the data. The electronic device may receive the data from at least one external electronic device included in the NAN cluster in an interval other than the DW interval. For example, according to the amount of data transmission, the electronic device may receive a part of the data from the at least one external electronic device during the DW interval, and may receive the remaining data from the at least one external electronic device in the interval other than the DW interval. The electronic device may receive the data from an external electronic device designated to transmit or receive the data in the interval other than the DW interval from among the at least one external electronic device. The electronic device may receive the data from the at least one external electronic device only during a time range designated in the interval other than the DW interval.

In step 1405, the electronic device detects, from the at least one piece of data, identification information (e.g., a MAC address or contact information) of the at least one external electronic device, and/or first service information (e.g., a call service, a message service, and/or a video call) that may be provided using the NAN protocol by the at least one external electronic device.

In step 1407, if it is requested to display information on a plurality of external electronic devices, which is stored in the electronic device (e.g., if a contacts application is selected), the electronic device checks information of at least one external electronic device, which includes the first service information and the identification information of the at least one external electronic device, in the information on the plurality of external electronic devices.

In step 1409, in the second communication state, if it is requested to display information on the plurality of external electronic devices, the electronic device displays information about the plurality of external electronic devices on a display and displays the first service information in the vicinity of where information on the at least one external electronic device included in the plurality of external electronic devices is displayed.

In step 1411, if the first service information displayed in the vicinity of where information of the at least one external electronic device is displayed is selected, the electronic device performs the first service with the selected external electronic device by using the NAN protocol in response to the selection. The electronic device may perform the first service with the selected external electronic device in an interval other than the DW interval based on the execution of an NDP setup.

Figure 15A:
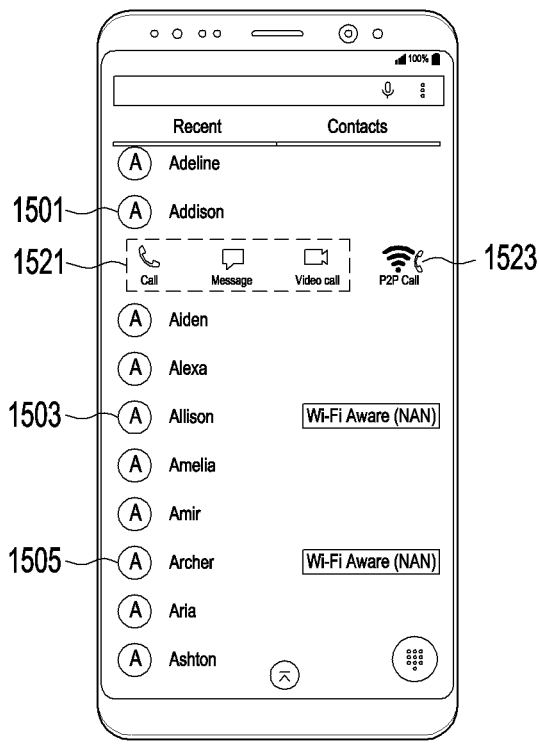
FIGS. 15A and 15B illustrate operations of providing service information by an electronic device according to an embodiment.

FIGS. 15A and 15 illustrate operations of providing service information by an electronic device according to an embodiment.

Referring to FIG. 15A, in a first communication state in which a protocol supported by a second communication circuit is activated, and a NAN protocol supported by a first communication circuit is activated, the electronic device may display communication service information 1523 that may be provided using the NAN protocol and second service information 1521 (e.g., a communication service, a message service, and a video call service) that may be provided using the protocol supported by the second communication circuit.

Figure 15B:
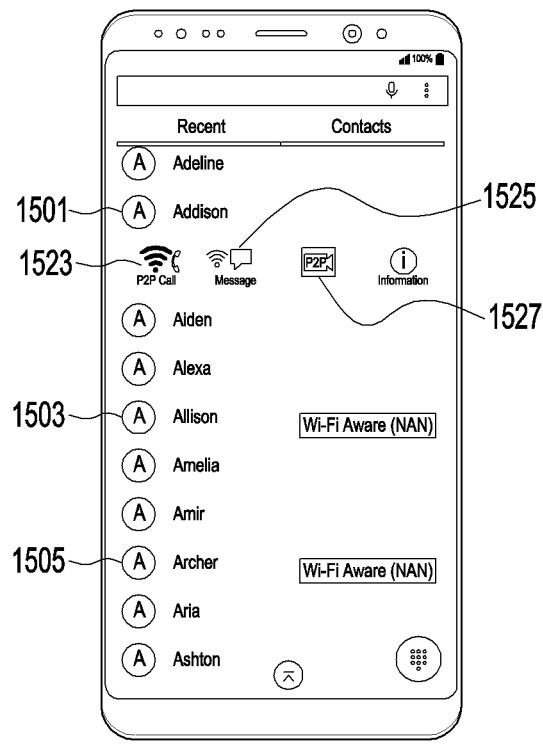

Referring to FIG. 15B, in a second communication state in which the protocol supported by the second communication circuit is deactivated, and the NAN protocol supported by the first communication circuit is activated, the electronic device may display only service information 1523, 1525 and 1527 that may be provided using the NAN protocol. The electronic device may display, as the service information that may be provided using the NAN protocol, communication service information 1523, message service information 1525, and sharing service information 1527 at a position where the second service information, which may be provided using the protocol supported by the second communication circuit in the first state, is displayed.

Figure 16A:
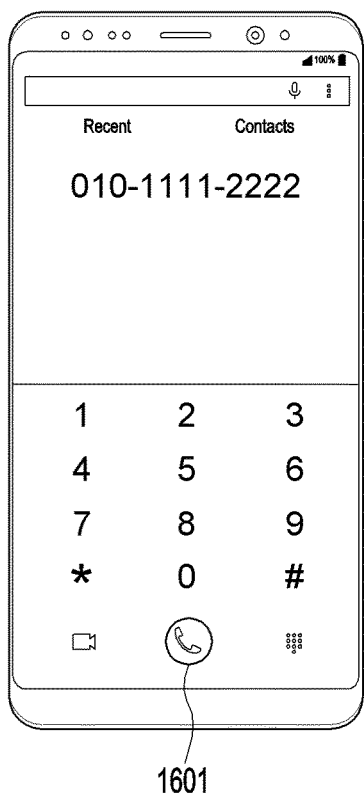
FIGS. 16A, 16B, and 16C illustrate operations of providing service information by an electronic device according to an embodiment.
Figure 16B:
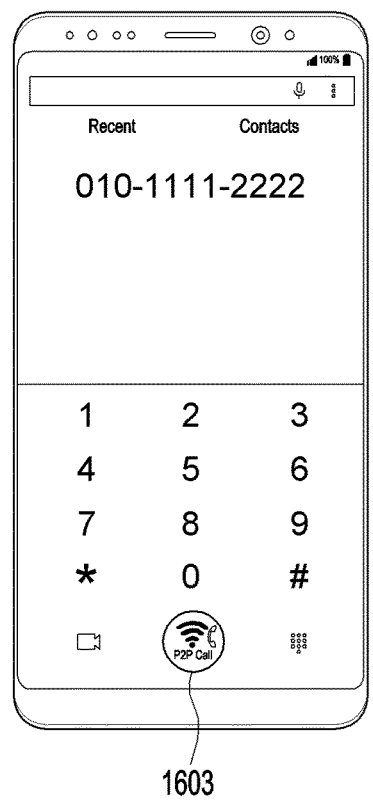
Figure 16C:
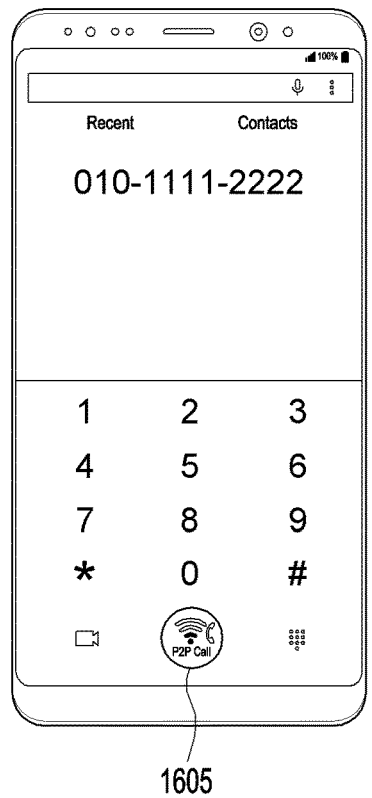

FIGS. 16A, 16B, and 16C illustrate operations of providing service information by an electronic device according to an embodiment.

Referring to FIG. 16A, in the first communication state in which the protocol supported by the second communication circuit is activated, and the NAN protocol supported by the first communication circuit is activated, the electronic device may display an indication for call connection provided in a call application mode, as a first indication 1601 notifying of call connection using the protocol supported by the second communication circuit.

Referring to FIGS. 16B and 16C, in the second communication state in which the protocol supported by the second communication circuit is deactivated, and the NAN protocol supported by the first communication circuit is activated, the electronic device may display an indication for call connection provided in the call application mode, as a second indication 1603 or 1605 notifying of call connection using the NAN protocol. The second indication 1603 or 1605 may be displayed differently from the indication for call connection provided in the call application mode, by using various visual objects, such as texts, colors, shapes, images, and/or icons.

In the second communication state in which the protocol supported by the second communication circuit is deactivated, and the NAN protocol supported by the first communication circuit is activated, the electronic device may differently display the second indication 1603 or 1605 notifying of call connection by using the NAN protocol, according to information (e.g., a signal strength) on a possibility of connection to an external electronic device associated with a user (010-1111-2222) to be connected for a call. The second indication 1603 of FIG. 16B may indicate that a call connection possibility is high, and the second indication 1605 of FIG. 16C may indicate that a call connection possibility is low. The second indication 1603 of FIG. 16B indicating that a call connection possibility is high and the second indication 1605 of FIG. 16C indicating that a call connection possibility is low may be distinguished and displayed using various visual objects, such as texts, shapes, colors, images, and/or icons.

Figure 17:
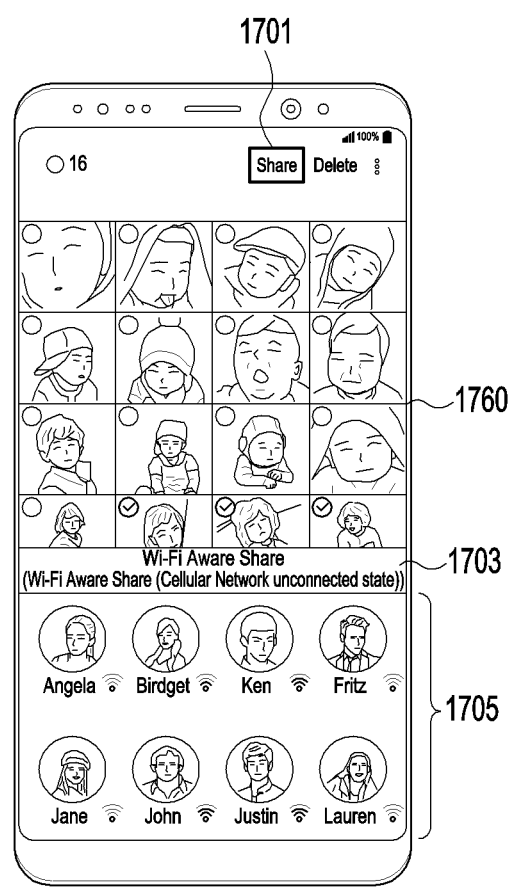
FIG. 17 illustrates operations of providing service information by an electronic device according to an embodiment.

FIG. 17 illustrates operations of providing service information by an electronic device according to an embodiment.

Referring to FIG. 17, in the second communication state in which the protocol supported by the second communication circuit is deactivated, and the NAN protocol supported by the first communication circuit is activated, the electronic device may display a sharing menu 1701 that may use the NAN protocol.

If a content (e.g., a photo) to be shared is selected from among a plurality of contents displayed on a display 1760, and a sharing menu 1701 is selected, the electronic device may display information 1703 indicating that the protocol supported by the second communication circuit is unavailable, and may display, on at least a part of the display 1760, information 1705 of at least one external electronic device that is connectable using the NAN protocol.

Alternatively, in the first communication state in which the protocol supported by the second communication circuit is activated, and the NAN protocol supported by the first communication circuit is activated, if a content (e.g., a photo) to be shared is selected from among a plurality of contents displayed on a display 1760, and a sharing menu 1701 is selected, the electronic device may display, on at least a part of the display 1760, information 1705 of at least one external electronic device that is connectable using the NAN protocol. The at least one external electronic device that is connectable using the NAN protocol may include connection possibility information (e.g., a signal strength). The at least one external electronic device may be listed based on the connection possibility information.

Figure 18:
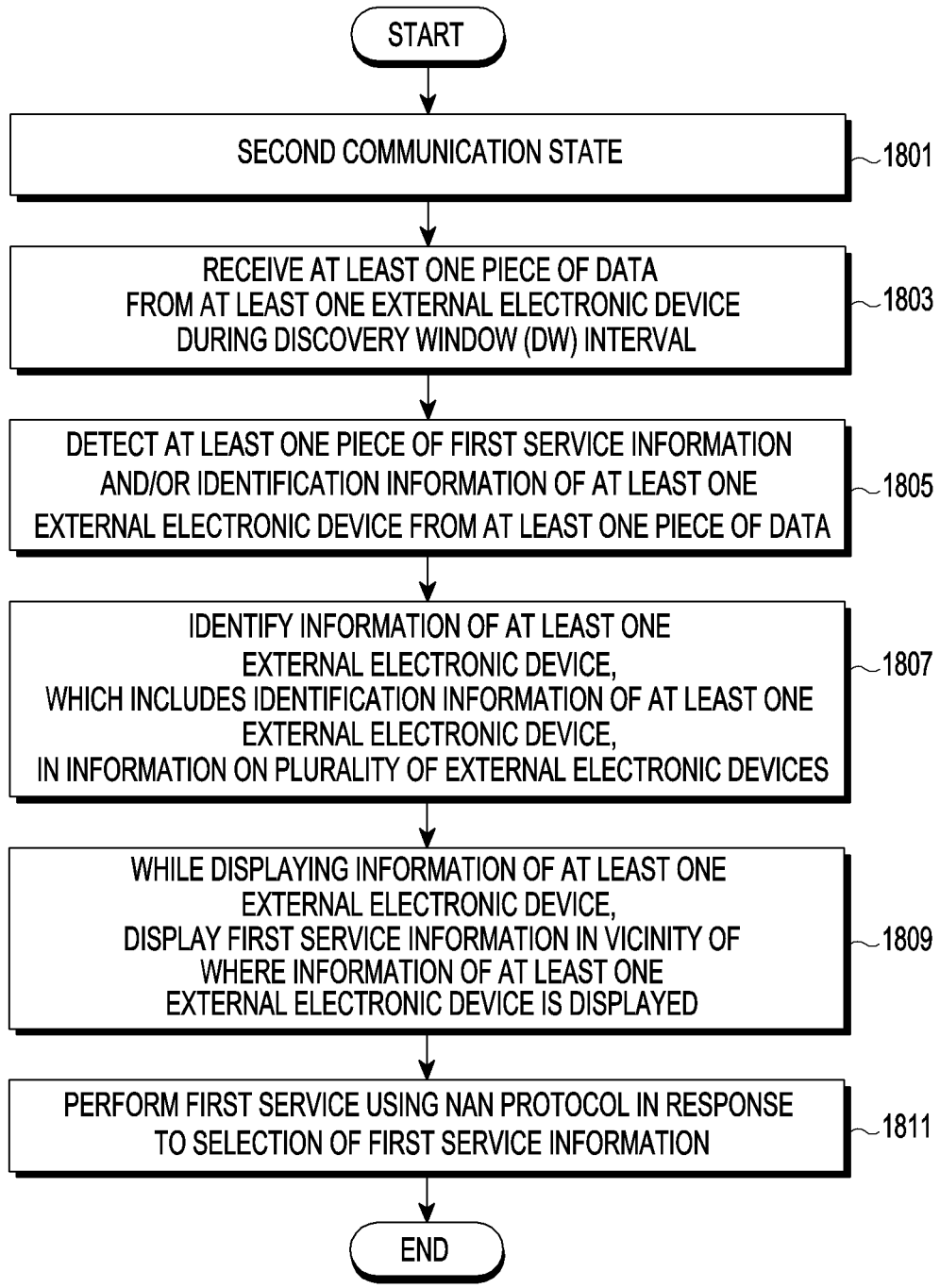
FIG. 18 is a flowchart illustrating a method for providing service information by an electronic device according to an embodiment.

FIG. 18 is a flowchart illustrating a method for providing service information by an electronic device according to an embodiment.

Referring to FIG. 18, in step 1801, the electronic device identifies that a second communication state in which a protocol supported by a second communication circuit is deactivated, and that a NAN protocol supported by a first communication circuit is activated based on a BLE protocol or user selection.

In step 1803, the electronic device receives data from at least one external electronic device included in the same NAN cluster during a DW interval. The electronic device may receive an SDF including the data. The electronic device may receive the data from at least one external electronic device included in the NAN cluster in an interval other than the DW interval. For example, according to the amount of data transmission, the electronic device may receive a part of the data from the at least one external electronic device during the DW interval, and may receive the remaining data from the at least one external electronic device in the interval other than the DW interval. The electronic device may receive the data from an external electronic device designated to transmit or receive the data in the interval other than the DW interval from among the at least one external electronic device. The electronic device may receive the data from the at least one external electronic device only during a time range designated in the interval other than the DW interval.

In step 1805, the electronic device detects, from the received at least one piece of data, identification information of the at least one external electronic device, and/or first service information (e.g., a call service, a message service, and/or a video call) that may be provided using the NAN protocol by the at least one external electronic device.

In step 1807, if it is requested to display information on a plurality of external electronic devices, which is stored in the electronic device (e.g., if a contacts application is selected), the electronic device checks information of at least one external electronic device, which includes identification information of the at least one external electronic device, in the information on the plurality of external electronic devices.

In step 1809, in the second communication state, if information on the plurality of external electronic devices, which is stored in the electronic device, is requested to be displayed, the electronic device displays, on a display, information of at least one external electronic device in information on the plurality of external electronic devices. The electronic device may display the first service information in the vicinity of where information on the at least one external electronic device is displayed.

In step 1811, if the first service information displayed in the vicinity of where information on the at least one external electronic device is displayed is selected, the electronic device performs a first service by using the NAN protocol in response to the selection. For example, the electronic device may perform the first service with the selected external electronic device in an interval other than the DW interval based on execution of an NDP setup.

Figure 19A:
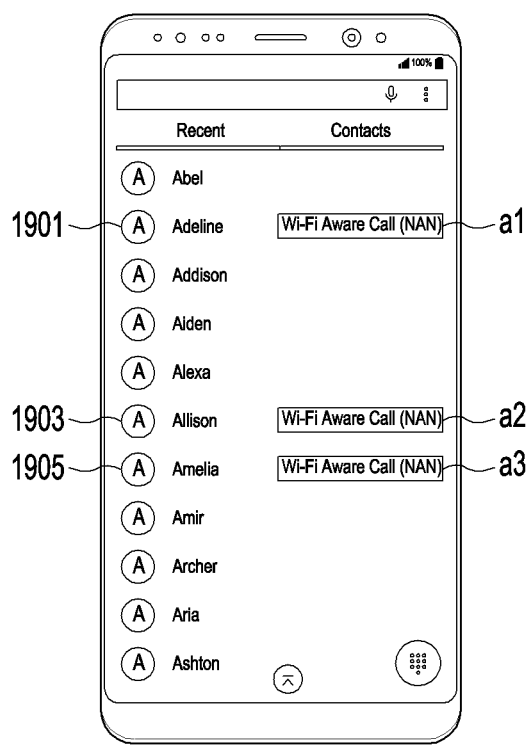
FIGS. 19A and 19B illustrate operations of providing service information by an electronic device according to an embodiment.
Figure 19B:
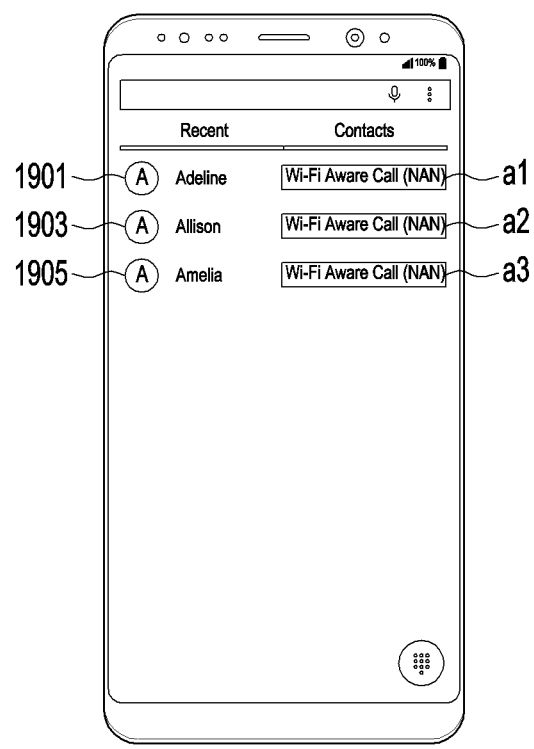

FIGS. 19A and 19B illustrate operations of providing service information by an electronic device according to an embodiment.

Referring to FIG. 19A, in a first communication state in which a protocol supported by a second communication circuit is activated, and a NAN protocol supported by a first communication circuit is activated, if a contacts application is selected from among various applications associated with display of information on a plurality of external electronic devices, the electronic device may display information on the plurality of external electronic devices. While displaying information (e.g., names) on the plurality of external electronic devices, the electronic device may display indications a1, a2, and a3 notifying that the NAN protocol is available, in the vicinity of where respective information 1901, 1903, and 1905 of at least one external electronic device that may provide a first service using the NAN protocol is displayed. The indications notifying that the NAN protocol is available may be distinguished and displayed using various visual objects, such as texts, colors, shapes, images, and/or icons.

Referring to FIG. 19B, in a second communication state in which the protocol supported by the second communication circuit is deactivated, and the NAN protocol supported by the first communication circuit is activated, when the contacts application is selected from among various applications associated with display of information on the plurality of external electronic devices, the electronic device may display only information 1901, 1903 and 1905 of at least one external electronic device, which may provide the first service by using the NAN protocol, in information of the plurality of external electronic devices. While displaying information 1901, 1903 and 1905 of the at least one external electronic device, the electronic device may display indications a1, a2, and a3 notifying that the NAN protocol is available, in the vicinity of where respective information 1901, 1903, and 1905 of the at least one external electronic device is displayed. The indications notifying that the NAN protocol is available may be distinguished and displayed using various visual objects, such as texts, colors, shapes, images, and/or icons.

Figure 20A:
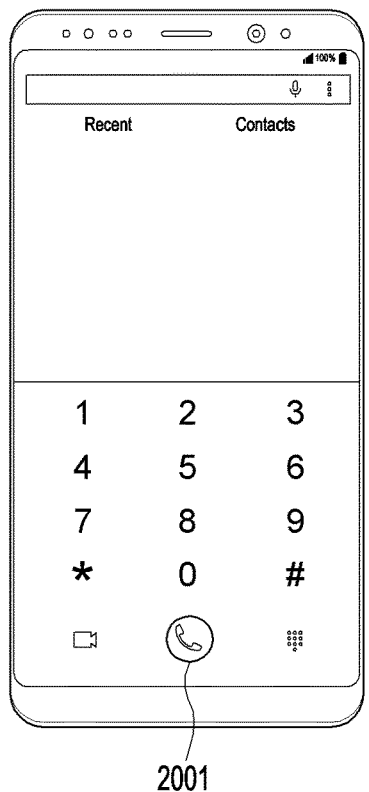
FIGS. 20A, 20B, and 20C illustrate operations of providing service information by an electronic device according to an embodiment.
Figure 20B:
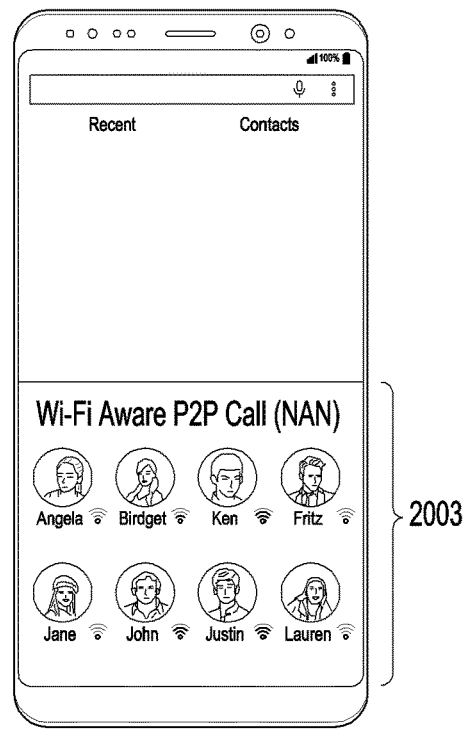
Figure 20C:
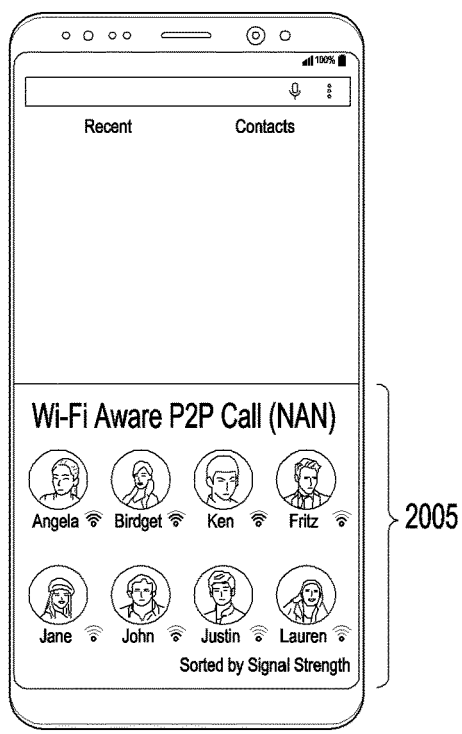

FIGS. 20A, 20B, and 20C illustrate operations of providing service information by an electronic device according to an embodiment.

Referring to FIG. 20A, in the first communication state in which the protocol supported by the second communication circuit is activated, and the NAN protocol supported by the first communication circuit is activated, the electronic device may provide an indication for call connection provided in a call application mode, as a first indication 2001 notifying of call connection using the protocol supported by the second communication circuit.

Referring to FIG. 20B, in the second communication state in which the protocol supported by the second communication circuit is deactivated, and the NAN protocol supported by the first communication circuit is activated, the electronic device may display information of at least one external electronic device, which may provide first service information by using the NAN protocol, in a partial area 2003 of a screen displaying the call application mode.

Referring to FIG. 20C, in the second communication state in which the protocol supported by the second communication circuit is deactivated, and the NAN protocol supported by the first communication circuit is activated, the electronic device may arrange and display information of at least one external electronic device, which may provide the first service information by using the NAN protocol, in a partial area 2005 of the screen displaying the call application mode according to information (e.g., a signal strength) on a possibility of connection to at least one external electronic device.

Figure 21:
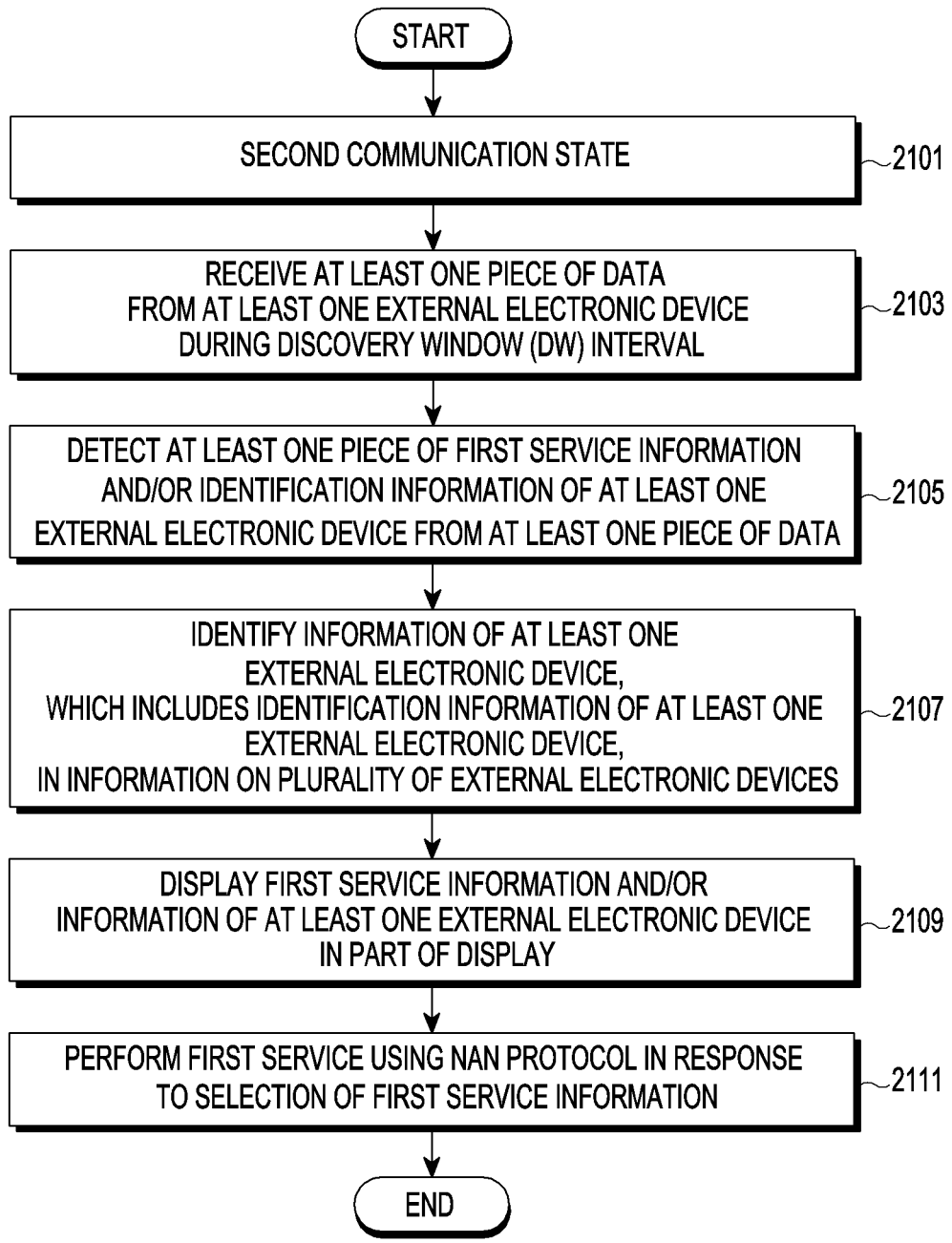
FIG. 21 is a flowchart illustrating a method for providing service information by an electronic device according to an embodiment.

FIG. 21 is a flowchart illustrating a method for providing service information by an electronic device according to an embodiment.

Referring to FIG. 21, in step 2101, the electronic device identifies that a second communication state in which a protocol supported by a second communication circuit is deactivated, and that a NAN protocol supported by a first communication is activated based on a BLE protocol or user selection.

In step 2103, the electronic device receives data from at least one external electronic device included in the same NAN cluster during a DW interval. The electronic device may receive the SDF including the data. The electronic device may receive the data from at least one external electronic device included in the NAN cluster in an interval other than the DW interval. For example, according to the amount of data transmission, the electronic device may receive a part of the data from the at least one external electronic device during the DW interval, and may receive the remaining data from the at least one external electronic device in the interval other than the DW interval. The electronic device may receive the data from an external electronic device designated to transmit or receive the data in the interval other than the DW interval from among the at least one external electronic device. The electronic device may receive the data from the at least one external electronic device only during a time range designated in the interval other than the DW interval.

In step 2105, the electronic device detects, from the at least one piece of data, identification information of the at least one external electronic device, and/or first service information that may be provided using the NAN protocol by the at least one external electronic device.

In step 2107, if it is requested to display information on a plurality of external electronic devices, which is stored in the electronic device (e.g., if a contacts application is selected), the electronic device checks information of at least one external electronic device, which includes identification information of the at least one external electronic device, in the information on the plurality of external electronic devices.

In step 2109, in the second communication state, the electronic device displays the first service information and information of the at least one external electronic device in the information on the plurality of external electronic devices, in a partial area (e.g., a partial area of a home screen) of a display.

In step 2111, if the first service information displayed in the vicinity of where information on the at least one external electronic device is displayed is selected, the electronic device performs a first service by using the NAN protocol in response to the selection. For example, the electronic device may perform the first service with the selected external electronic device in an interval other than the DW interval based on execution of an NDP setup.

Figure 22:
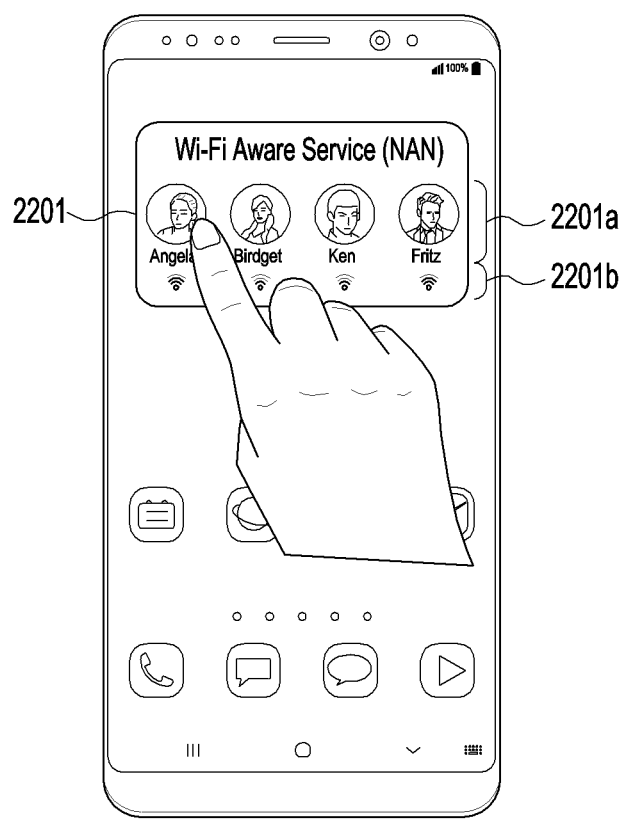
FIG. 22 illustrates operations of providing service information by an electronic device according to an embodiment.

FIG. 22 illustrates operations of providing service information by an electronic device according to an embodiment.

Referring to FIG. 22, in a first communication state in which a protocol supported by a second communication is activated, and a protocol supported by a first communication circuit is activated, the electronic device may display, in a partial area 2201 of a display, connection possibility information 2201b (e.g., a signal strength) and/or information 2201a of at least one external electronic device, which may provide first service information by using the NAN protocol, in information on a plurality of external electronic devices, which is stored in the electronic device. The electronic device may display at least one external electronic device that may provide the first service information by using the NAN protocol, according to a designated condition. If the designated condition is an external electronic device currently available for a call, the electronic device may display information of at least one external electronic device, which may provide current first service information (e.g., a call service, a message service, and/or a video call) by using the NAN protocol, in information on the plurality of external electronic devices. The information of the external electronic device may be displayed differently according to types of the first service information (e.g., a call service, a message service, and/or a video call). If the designated condition is the number of connection times, the electronic device may detect and display at least one external electronic device in information on the plurality of external electronic devices in descending order of the number of connection times for execution of a first service based on the NAN protocol.

The electronic device may display each of at least one external electronic device that may provide the first service information by using the NAN protocol, in the form of a widget or shortcut icon.

If information of one external electronic device is selected from information 2201a of the at least one external electronic device, the electronic device may display the first service information that may be provided using the NAN protocol. The electronic device may select information of the at least one external electronic device via touch or hovering. If a touch or hovering is detected from a widget or a shortcut icon indicating each of the at least one external electronic device, the electronic device may display the first service information that may be provided using the NAN protocol or may immediately perform the first service configured as default.

Figure 23:
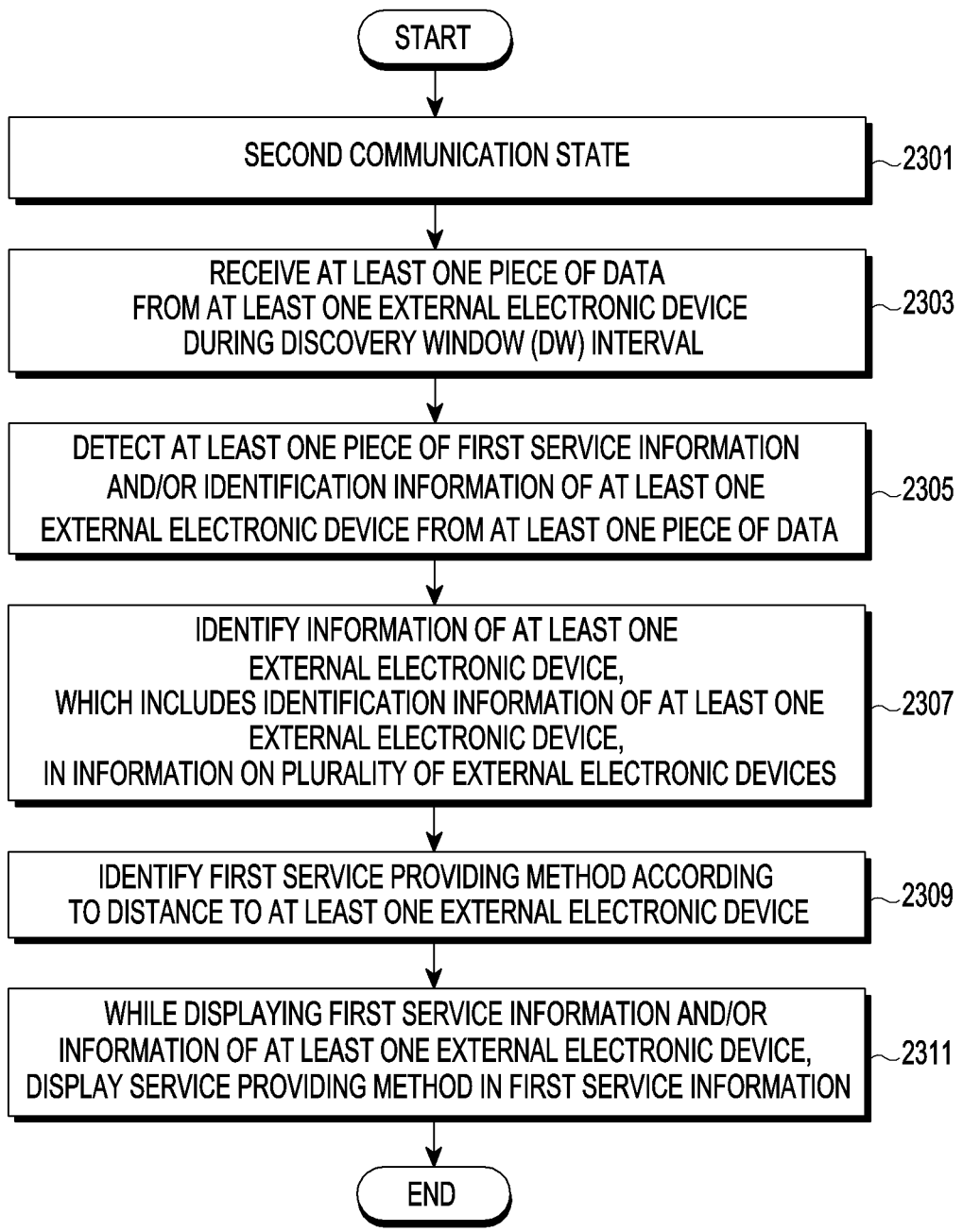
FIG. 23 is a flowchart illustrating a method for providing service information by an electronic device according to an embodiment.

FIG. 23 is a flowchart illustrating a method for providing service information by an electronic device according to an embodiment.

Referring to FIG. 23, in step 2301, the electronic device identifies that a second communication state in which a protocol supported by a second communication circuit is deactivated, and that a NAN protocol supported by a first communication circuit is activated based on a BLE protocol or user selection.

In step 2303, the electronic device receives data from at least one external electronic device included in the same NAN cluster during a DW interval. The electronic device may receive an SDF including the data.

In step 2305, the electronic device detects, from the at least one piece of data, identification of the at least one external electronic device, and/or first service information that may be provided using the NAN protocol by the at least one external electronic device.

In step 2307, if it is requested to display information on a plurality of external electronic devices, which is stored in the electronic device (e.g., if a contacts application is selected), the electronic device checks information of at least one external electronic device, which includes identification information of the at least one external electronic device, in the information on the plurality of external electronic devices.

In step 2309, in the second communication state, based on at least one of data including the first service information received from the at least one external electronic device, connection possibility information (e.g., a signal strength) for identification of a possibility of connection to the at least one external electronic device by using the NAN protocol, or a ranging technology of NAN, the electronic device may identify a method for providing the first service information according to a distance to the at least one external electronic device. For a call service, while displaying information of at least one external electronic device capable of providing the service by using the NAN protocol, the electronic device may identify an encoding scheme to be used for communication according to distance, and may classify the call service as, e.g., a high definition (HD) call or a normal call, based on an external electronic device in a close distance.

In step 2311, while displaying information of the at least one external electronic device and/or the first service information on a display, the electronic device classifies and displays the first service information according to the identified method for providing the first service information.

In step 2313, if the first service information displayed in the vicinity of where information of the at least one external electronic device is displayed is selected, the electronic device performs the first service with the selected external electronic device by using the NAN protocol in response to the selection. The electronic device may perform the first service with the selected external electronic device in an interval other than the DW interval based on execution of an NDP setup.

Figure 24:
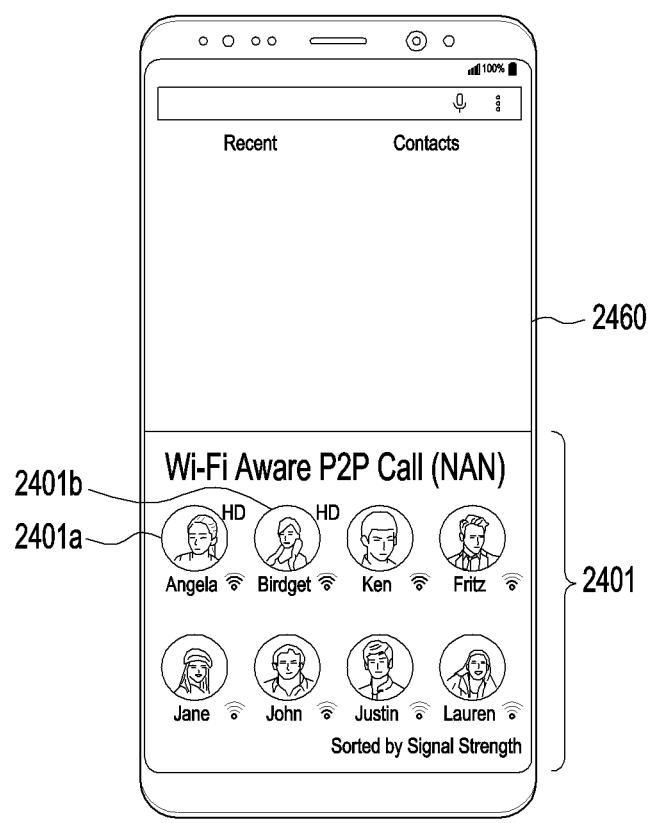
FIG. 24 illustrates operations of providing service information by an electronic device according to an embodiment.

FIG. 24 illustrates operations of providing service information by an electronic device according to an embodiment.

Referring to FIG. 24, in a second communication state in which a protocol supported by a second communication circuit is deactivated, and a NAN protocol supported by a first communication circuit is activated, the electronic device may display information of at least one external electronic device, which may provide call service information by using the NAN protocol, in a partial area 2401 of a display 2460 that displays a call application mode. While displaying information of at least one external electronic device capable of providing a call service by using the NAN protocol, the electronic device may identify an encoding scheme to be used for communication according to distance, and may identify a method for providing the call service (e.g., an HD call or a normal call), which corresponds to information of at least one external electronic device, based on an external electronic device in a close distance. The electronic device may indicate that an HD call service may be provided, in information 2401a and 2401b of at least one external electronic device, which may provide the HD call service, in information of the at least one external electronic device. Although FIG. 24 only illustrates an indication indicating that an HD call service may be provided, other indications may be provided, e.g., an indication that a normal call service may be provided, and the indications may be distinguished and displayed using various visual objects, such as texts, shapes, colors, images, and/or icons.

Figure 25:
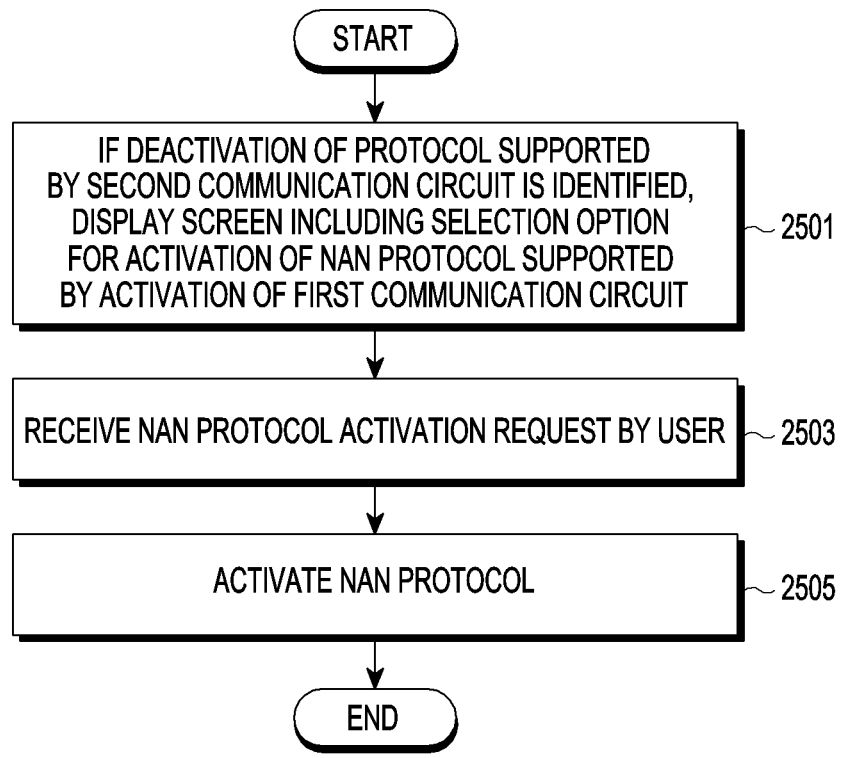
FIG. 25 is a flowchart illustrating a method for providing service information by an electronic device according to an embodiment.

FIG. 25 is a flowchart illustrating a method for providing service information by an electronic device according to an embodiment.

Referring to FIG. 25, in step 2501, if deactivation of a protocol supported by a second communication circuit is identified, the electronic device displays, on a display, a screen including a selection option for activation of a NAN protocol supported by a first communication circuit.

In step 2503, the electronic device receives a user request for activation of the NAN protocol while the screen including the selection option is displayed.

In step 2505, the electronic device switches a state to a second communication state for activation of the NAN protocol, according to the user request for activation of the NAN protocol.

Figure 26:
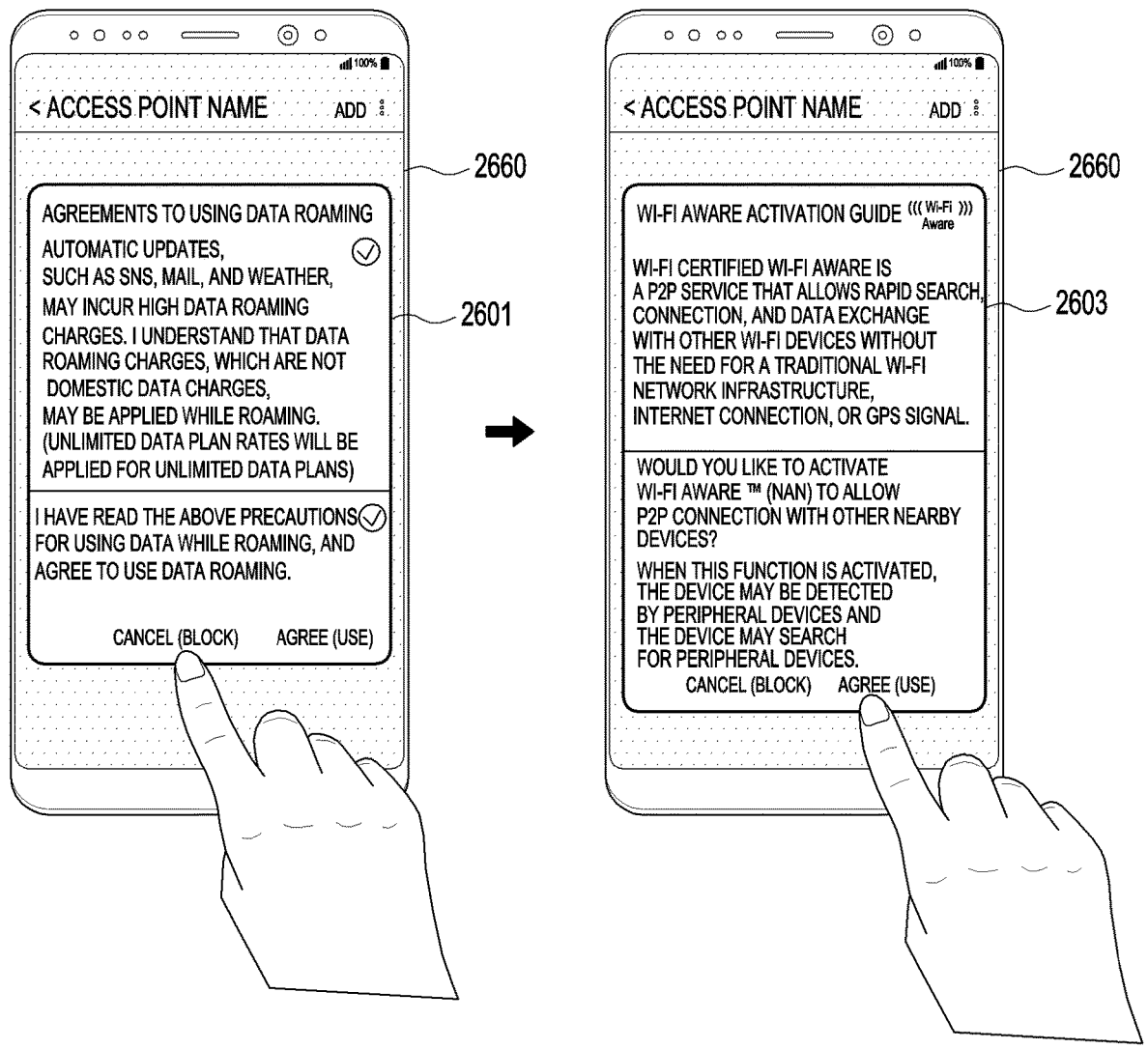
FIG. 26 illustrates operations of providing service information by an electronic device according to an embodiment.

FIG. 26 illustrates operations of providing service information by an electronic device according to an embodiment.

Referring to FIG. 26, if a protocol supported by a second communication circuit is identified to be deactivated, the electronic device displays, on a display 2660, a screen 2601 for receiving consent for data roaming. If the user does not agree to data roaming, the electronic device may display a screen 2603 including a selection option for activation of a NAN protocol supported by a first communication circuit. If "Agree" is selected on the screen 2603 including the selection option for activation of the NAN protocol supported by the first communication circuit, the electronic device may activate the NAN protocol supported by the first communication circuit.

According to an embodiment, a method for providing service information by an electronic device may include, if a NAN protocol supported by a first communication circuit is activated, receiving data from at least one external electronic device during a DW interval synchronized in a cluster, identifying whether identification information of the at least one external electronic device having transmitted the data is stored in the memory, if the identification information of the at least one external electronic device is stored, storing information, which is obtained by matching at least a part of the received data with the identification information, in the memory, and if a request for performing a service is received, displaying information of the at least one external electronic device configured to perform the service, based on the matched and stored information.

The data may include the identification information of the external electronic device and service information that may be provided using the NAN protocol by the external electronic device.

The method may further include, if the NAN protocol supported by the first communication circuit is activated, generating data including the identification information of the electronic device and service information that may be provided using the NAN protocol by the electronic device, and transmitting the generated data to the at least one external electronic device during the discovery window interval.

The method may further include identifying connection possibility information for performing the service with at least one external electronic device, and displaying the identified connection possibility information on the display of the electronic device.

The method may further include, based on the received data, identifying information of at least one external electronic device configured to provide service information matching service information that can be provided using the NAN protocol by the electronic device.

The method may further include, in a first communication state where a second protocol which differs from the NAN protocol and is supported by a second communication circuit is activated, and the NAN protocol supported by the first communication circuit is activated, receiving a request for displaying information on a plurality of external electronic devices, which is stored in the electronic device, and in response to the request for displaying, displaying service information provided using the NAN protocol and service information provided using the second protocol, in the vicinity of where the information of the at least one external electronic device included in the information on the plurality of external electronic devices is displayed.

The method may further include, in a second communication state where a second protocol which differs from the NAN protocol and is supported by a second communication circuit is deactivated, and the NAN protocol supported by the first communication circuit is activated, receiving a request for displaying information on the plurality of external electronic devices, which is stored in the electronic device, and displaying the service information provided via the NAN protocol, in the vicinity of where the information of the at least one external electronic device included in the information on the plurality of external electronic devices is displayed, in response to the request for displaying.

The method may further include, in a state where a BLE protocol supported by a third communication circuit is activated, activating the NAN protocol supported by the first communication circuit based on information received via the third communication circuit, and receiving, via the BLE protocol, service information provided via the NAN protocol.

An electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

For a storage medium that stores instructions, the instructions are configured to, when executed by at least one processor, cause the at least one processor to perform at least one operation, wherein the at least one operation may include if a NAN protocol supported by a first communication circuit is activated, receiving data from at least one external electronic device during a discovery window interval synchronized in a cluster; identifying whether identification information of the at least one external electronic device having transmitted the data is stored in the memory; if the identification information of the at least one external electronic device is stored, storing information, which is obtained by matching at least a part of the received data with the identification information, in the memory; and if a request for performing a service is received, displaying information of at least one external electronic device configured to perform the service, based on the matched and stored information.

According to the above-described embodiments, in an environment in which use of a cellular network and a Wi-Fi access point connection are restricted, an electronic device can switch an existing cellular network-based communication service to a D2D communication network service based on a NAN protocol, in order to provide the D2D communication network service.

Additionally, while maintaining the same user experience as that for a service related to the cellular network, a service similar to that provided by the cellular network can be provided via a D2D communication network service based on the NAN protocol.

Additionally, a user can execute a service function (e.g., a call service function or a message service function) basically provided by the electronic device, by easily performing a communication-connection to an electronic device of a nearby user, without using a cellular network connection or a Wi-Fi access point connection.

While the disclosure has been shown and described with reference to certain embodiments thereof, it will be understood by those skilled in the art that various changes in form and details may be made therein without departing from the spirit and scope of the disclosure as defined by the appended claims and any equivalents thereof.

What is claimed is:

1. An electronic device, comprising:
   a first communication circuit configured to support a neighbor awareness networking (NAN) protocol;
   a second communication circuit configured to support a second protocol that is different from the NAN protocol;
   a memory; and
   a processor configured to:
      activate the NAN protocol supported by the first communication circuit,
      receive data from at least one external electronic device during a discovery window (DW) interval synchronized in a cluster via the first communication circuit, identify whether identification information of the at least one external electronic device having transmitted the data is stored in the memory, if the identification information of the at least one external electronic device is stored in the memory, store, in the memory, information that is obtained by matching at least a part of the received data with the identification information, and if a request for performing a service is received, display information of the at least one external electronic device configured to perform the service, based on the information stored in the memory.

2. The electronic device of claim 1, wherein the data comprises the identification information of the external electronic device and service information for services that can be provided by the external electronic device using the NAN protocol.

3. The electronic device of claim 1, wherein the processor is further configured to:

if the NAN protocol is activated, generate data including identification information of the electronic device and service information for services that can be provided by the electronic device using the NAN protocol, and transmit the generated data to the at least one external electronic device during the DW interval via the first communication circuit.

4. The electronic device of claim 1, wherein the processor is further configured to:

identify connection possibility information for performing the service with the at least one external electronic device, and display the identified connection possibility information.

5. The electronic device of claim 1, wherein the processor is further configured to receive the data from the at least one external electronic device in an interval other than the DW interval.

6. The electronic device of claim 1, wherein the processor is further configured to, based on the received data, identify information of the at least one external electronic device that provides service information for a service that can be provided by the electronic device using the NAN protocol.

7. The electronic device of claim 1, wherein the processor is further configured to:

in a first communication state in which the second protocol supported by the second communication circuit is activated and the NAN protocol supported by the first communication circuit is activated, receive a request for displaying information of at least one external electronic device that is stored in the electronic device; and in response to the request for displaying, display service information provided using the NAN protocol and service information provided using the second protocol, in a vicinity of where the information of the at least one external electronic device is displayed.

8. The electronic device of claim 1, wherein the processor is further configured to:

in a second communication state in which the second protocol supported by the second communication circuit is deactivated and the NAN protocol supported by the first communication circuit is activated, receive a request for displaying information of a plurality of external electronic devices that is stored in the electronic device; and in response to the request for displaying, display service information provided via the NAN protocol in a vicinity of where information of the at least one external electronic device is displayed.

9. The electronic device of claim 1, further comprising a third communication circuit configured to support a Bluetooth low energy (BLE) protocol, wherein the processor is further configured to:

in a state in which the BLE protocol is activated, activate the NAN protocol supported by the first communication circuit, based on information received via the third communication circuit; and receive, via the BLE protocol, service information provided via the NAN protocol.

10. The electronic device of claim 1, wherein the processor is further configured to, if service information displayed in a vicinity of where information of the at least one external electronic device is displayed is selected, establish a communication connection to the external electronic device by using the NAN protocol of the first communication circuit to perform the service.

11. An electronic device, comprising:

a first communication circuit configured to support a neighbor awareness networking (NAN) protocol;

a second communication circuit configured to support a second protocol that is different from the NAN protocol;

a memory; and a processor configured to:

if deactivation of the second protocol supported by the second communication circuit is identified, activate the NAN protocol supported by the first communication circuit, receive data from at least one external electronic device during a discovery window (DW) interval synchronized in a cluster, based on the data, identify information of the at least one external electronic device, in information on a plurality of external electronic devices that is stored in the memory and service information that can be provided by the at least one external electronic device using the NAN protocol, and in response to a request for displaying the service information, display the information of the at least one external electronic device and the service information that can be provided by the at least one external electronic device using the NAN protocol.

12. The electronic device of claim 11, wherein the received data comprise identification information of the at least one external electronic device and service information that can be provided by the at least one external electronic device using the NAN protocol.

13. A method for providing service information by an electronic device, the method comprising:

receiving, while a neighbor awareness networking (NAN) protocol supported by a first communication circuit is activated, data from at least one external electronic device during a discovery window (DW) interval synchronized in a cluster;

identifying whether identification information of the at least one external electronic device having transmitted the data is stored in a memory of the electronic device;

in response to the identification information of the at least one external electronic device being stored in the memory of the electronic device, storing, in the memory, information that is obtained by matching at least a part of the received data with the identification information;

receiving a request for performing a service; and displaying, in response to the request, information of the at least one external electronic device configured to perform the service, based on the information stored in the memory.

14. The method of claim 13, wherein the data includes the identification information of the external electronic device and service information for services that can be provided by the external electronic device using the NAN protocol.

15. The method of claim 13, further comprising:
generating, while the NAN protocol supported by the first communication circuit is activated, data including identification information of the electronic device and service information for services that can be provided by the electronic device using the NAN protocol; and
transmitting the generated data to the at least one external electronic device during the DW interval.

16. The method of claim 13, further comprising:
identifying connection possibility information for performing the service with the at least one external electronic device; and
displaying the identified connection possibility information on a display of the electronic device.

17. The method of claim 13, further comprising identifying, based on the received data, information of the at least one external electronic device configured to provide service information for services that can be provided by the electronic device using the NAN protocol.

18. The method of claim 13, further comprising:
receiving, in a first communication state in which a second protocol that differs from the NAN protocol and is supported by a second communication circuit is activated, and the NAN protocol supported by the first communication circuit is activated, a request for displaying information of a plurality of external electronic devices that is stored in the memory of the electronic device; and
in response to the request for displaying, displaying service information provided using the NAN protocol and service information provided using the second protocol, in a vicinity of where information of the at least one external electronic device, which is included in the information of the plurality of external electronic devices, is displayed.

19. The method of claim 13, further comprising:
receiving, in a second communication state in which a second protocol which differs from the NAN protocol and is supported by a second communication circuit is deactivated, and the NAN protocol supported by the first communication circuit is activated, a request for displaying information of a plurality of external electronic devices that is stored in the memory of the electronic device; and
in response to the request for displaying, displaying service information provided via the NAN protocol in a vicinity of where information of the at least one external electronic device, which is included in the information of the plurality of external electronic devices, is displayed.

20. The method of claim 13, further comprising:
activating, in a state in which a Bluetooth low energy (BLE) protocol supported by a third communication circuit is activated, the NAN protocol supported by the first communication circuit, based on information received via the third communication circuit; and
receiving, via the BLE protocol, service information provided via the NAN protocol.

* * * * *